United States Patent
Mancey et al.

(10) Patent No.: US 7,155,622 B2
(45) Date of Patent: Dec. 26, 2006

(54) SYSTEM AND METHOD FOR THE MANAGEMENT OF POWER SUPPLIED OVER DATA LINES

(75) Inventors: Steven K. J. Mancey, Hemel Hempstead (GB); Paul J. Moran, Hemel Hempstead (GB); William G. Roose, St Albans (GB); Peter T. Doggart, Aylesbury (GB); Nigel S. Garbett, Ickenham (GB)

(73) Assignee: 3Com Corporation, Marlborough, MA (US)

( * ) Notice: Subject to any disclaimer, the term of this patent is extended or adjusted under 35 U.S.C. 154(b) by 426 days.

(21) Appl. No.: 10/477,603

(22) PCT Filed: May 15, 2003

(86) PCT No.: PCT/GB03/02095

§ 371 (c)(1),
(2), (4) Date: Nov. 14, 2003

(87) PCT Pub. No.: WO2004/102894

PCT Pub. Date: Nov. 25, 2004

(65) Prior Publication Data

US 2004/0230846 A1    Nov. 18, 2004

(51) Int. Cl.
*G06F 1/26* (2006.01)
*G06F 1/28* (2006.01)
*G06F 1/30* (2006.01)
*G06F 1/32* (2006.01)

(52) U.S. Cl. ............... 713/324; 713/310; 713/320; 713/323

(58) Field of Classification Search ............ None
See application file for complete search history.

(56) References Cited

U.S. PATENT DOCUMENTS

| 4,499,578 | A | * | 2/1985 | Marouf et al. ............ 370/267 |
| 5,148,144 | A | | 9/1992 | Sutterlin et al. |
| 6,218,930 | B1 | | 4/2001 | Katzenberg et al. |
| 6,466,088 | B1 | * | 10/2002 | Rezvani et al. ............ 330/51 |
| 6,470,401 | B1 | | 10/2002 | Peterson |
| 6,680,951 | B1 | * | 1/2004 | Aznar et al. .............. 710/36 |
| 2003/0202655 | A1 | * | 10/2003 | Nattkemper et al. ...... 379/413 |
| 2004/0230848 | A1 | * | 11/2004 | Mayo et al. ............. 713/320 |

* cited by examiner

*Primary Examiner*—James K. Trujillo
(74) *Attorney, Agent, or Firm*—Richard A. Baker, Jr.

(57) ABSTRACT

A system for providing power over data lines, particularly Ethernet data lines, comprises a network switch including a multiplicity of ports each of which is capable of supplying power in addition to data packets, a controllable power source which is coupled to said ports for supplying power thereto and a processor which is coupled to control the supply of power by the power source. The processor is programmed to guarantee the supply of power to selected ports and to allow or inhibit the supply of power to ports other than the selected ports, having regard to a specified limit on the supply of power by the controllable power source and the total guaranteed power to the selected ports.

10 Claims, 8 Drawing Sheets

SYSTEM AND METHOD FOR THE MANAGEMENT OF POWER SUPPLIED OVER DATA LINES

FIELD OF THE INVENTION

This invention relates to the management of power supplied over data lines and in particular to the management of power supplied over standard physical connections conforming to an Ethernet Standard, particularly those conforming to IEEE Standard 802.3 and certain later developments described below.

BACKGROUND TO THE INVENTION

Although in past times it has been known to provide signalling on a power line to a user's equipment, such as in the customary standard telephone system wherein a voice signal is combined with a power signal, or to provide signalling over mains supply lines, traditional systems do not provide sufficient bandwidth for modern data communications generally and packet-based communication systems such as Ethernet. ISDN communication systems include the transmission of power and digital data between an ISDN modem and a telephone switch. However, ISDN data rates are very much lower than typical data rates in packet-based communication systems such as Ethernet. It is common practice therefore to provide power and data over separate lines to network devices such as data terminal equipment. Nevertheless, the provision of power to an end device, such as a computer, Ethernet telephone, or other peripheral device, using standard Ethernet physical connection, such as twisted-pair wiring, is desirable for many purposes. The local provision of power can be problematic for Ethernet based devices. One example is a security camera wherein the provision of local continuous power may be difficult or undesirable, from the point of view of making the camera secure, and yet the provision of battery power, with its inherently limited life, may be undesirable or inconvenient. Furthermore, more recently developed wireless network adapters would be more versatile if they allow associated terminal equipment, such as personal computers, to be moved to any location within the range of the communication system without requiring a neighbouring mains power outlet.

It is currently known to provide power over an Ethernet connection and specific devices for the provision of power over Ethernet connections are described in, for example, U.S. Pat. No. 5,994,998 issued 30 Nov. 1999 to Fisher et al and U.S. Pat. No. 6,535,983 issued 18 Mar. 2003 to McCormack et al, both assigned to 3Com Corporation of Santa Clara, Calif.

It is known in the art, from the aforementioned patents and elsewhere, particularly a recently developed draft Standard IEEE 802.3af, to provide power from an Ethernet port over a twisted-pair link by means of balanced transformer couplings and appropriate filtration. The current draft Standard allows power up to a specified limit, currently 15.4 watts, to be sourced from a 'power over Ethernet' (PoE) port to a powered device. At least some of the ports of a network device, such as a switch, are coupled to a power source, herein called power supply equipment (PSE) which is controllable to supply power up to that limit to a multiplicity of ports. However, for PSEs that are not capable of supplying the maximum power simultaneously to all the respective ports, due for example to power supply design constraints, there inherently exist circumstances wherein 'power over Ethernet' ports must restrict or cease the supply of power. This may happen dynamically as existing powered devices fluctuate in their power requirements or as new powered devices are connected to the power supply equipment. This can lead to unfortunate occurrences, such as an unexpected cessation of supply to a particular powered device.

SUMMARY OF THE INVENTION

The present invention is a system and corresponding method of control primarily intended for use in relation to a switch which has a multiplicity of ports for the transmission and reception of data packets, wherein at least some of the ports can supply power over a respective link, particularly in accordance with IEEE Standard 802.3af. The invention allows the supply of power to be guaranteed to a specified limit to selected ports coupled to the power supply equipment. Broadly, by control of the priority of each port within the scope of the power supply equipment and by means of calculating the power budget of these 'guaranteed' ports, the power supply equipment can ensure that at least some ports within the system will never lose power, on the assumption of continued correct operation of the power supply equipment. The supply of power to other ports will depend on the power limit of the PSE and the total guaranteed power.

In a preferred example of the present invention, there are four power modes which can be assigned to each 'power over Ethernet' port.

A first mode, called herein 'power disabled' mode, prevents the supply of power over Ethernet for the respective port. No power is supplied over the Ethernet connection to the remote device. Such a mode may be required in certain circumstances, for example if the remote device is shut down or if the remote device is a device which does not require the supply of power over the Ethernet connection. In terms of the IETF power MIB, discussed later, the 'pethPsePortAdminEnable' object would be set to 'disabled'.

A second mode is a 'power enabled' mode. In this mode it is assumed that any port can draw up to the specified maximum, currently 15.4 watts, from the power supply equipment. When the power consumption or budget of the power device is exceeded, power will not be guaranteed to this port. If any port should increase its power requirements or a guaranteed port is connected, causing the total power budget to be exceeded, one or more ports in a 'power-enabled' mode may be disabled until the power supply equipment is back within its maximum power budget. It is preferable in this scheme to disconnect the ports in a particular order of priority.

Preferably this mode is a default mode for a power over Ethernet port. It relates to the following power MIB configuration: the pethPsePortAdminEnable object is set to 'enabled' and the pethPsePortPowerPriority object will be set to 'low'.

In this mode it is preferable to enable an auto detection feature to detect particular power devices and place them into a power auto-guaranteed mode, discussed below.

A third mode is a 'power guaranteed' mode. This mode allows a defined amount of power to be guaranteed to a port. Only a limited number of ports may enter this mode at any time. For example, if ten ports supplied by the power supply equipment have entered this mode at the maximum rating, namely 15.4 watts, and the power supply equipment has a total power capability of 160 watts, a request for the access of another port into this mode at more than 6 watts will be denied.

Preferably the default behaviour of the power supply equipment is to guarantee a port the full maximum power allowed. However optionally the power may be limited on a port to allow more ports access to a guaranteed power mode.

Preferably, if any port tries to draw more power than its guaranteed power limit, the power supply equipment will stop delivering power or will restrict the power, corresponding to that limit, on that port. This is desirable to ensure that the other guaranteed ports are still guaranteed their power allocations. If the power to the port has been stopped, the power supply equipment may have a choice whether to redetect automatically the power device, according to the IEEE 802.3af Standard, and subsequently re-power the port up to its power limit, or to disable permanently the power over Ethernet supply support until it is re-enabled, for example by a user.

In a practical example, this mode relates to the following power MIB configuration: pethPsePortAdminEnable object is set to 'enabled'; pethPsePortPowerPriority object is set to 'critical'.

A fourth, optional mode, is a 'power auto-guaranteed' mode. This mode is in substance the same as the 'power guaranteed' mode noted above except that the power device has been automatically detected to be a known device with known power settings dictated by a predefined power profile. The equipment may include therefore a library of devices with their respective power profiles.

When a port is in a 'power enabled' mode, with an auto-detect object set to enabled, and a known power device is detected, the port would be automatically placed into the auto guaranteed mode. As for the power guaranteed mode, this would only occur if there were enough power left within the guaranteed power budget.

If a port in an auto-guaranteed mode should experience any physical link up/down events, then it may be cause to revert to the power enabled mode. Power auto-detection then may reoccur. Such an expedient is desirable to ensure that if the detected power device is disconnected and a different powered device is connected, with a different predefined power profile, the new device does not automatically assume the power over Ethernet settings for the previously detected powered device.

Various other features of a preferred system according to the invention will be defined by certain 'objects', namely settable variables in the computer program which will be employed in the processor that controls the power supply equipment.

One object in this category is a power limit, specifying the power limit set on a particular port. Such an object will be read/write integer value, with units of power such as milliwatts. The purpose of this 'object' is to define the level of power which can be supplied to the specified port and to ensure that the power supply equipment will not supply more than the specified limit of power.

Another object is a 'guaranteed power remaining' object which will specify the reserve of power in the guaranteed power pool. Each time a port is placed into the power guaranteed mode there will be reserved a predetermined quantity of power from the guaranteed power supply. The intention of this object is to give the client of the MIB, whether that be the CLI or the web interface or an end user, an indication of how many more ports can validly be placed into a power guaranteed mode. In a specific implementation, this object will be a read only integer value with units of watts.

Another object is an auto-detection active object which will specify whether the device auto-detection feature is active. If the object is set to active and a known power device is connected, the port will automatically switch to the auto guaranteed mode.

A preferred system according to the invention also employs PSE profiles, which exist to assist the user in configuring power of Ethernet devices. Ideally, there should be a power profile for each different type of 'power over Ethernet' device which might be connected to the power supply equipment. Some pre-set power profiles will exist on the equipment for devices such as NBX telephones, but others will not. Each power profile will contain a name, a power mode, an associated power rating, or more strictly, a power limit for the associated device. Once installed in the equipment, these profiles allow a user to guarantee power to power over Ethernet devices without needing to know details of the device's power requirements. Profiles also allow management tools to identify the types of power device connected to the power supply equipment.

Further features of the invention will become apparent from the following description with reference to the accompanying drawings.

DETAILED DESCRIPTION OF A SPECIFIC EXAMPLE

As is previously indicated, the present invention concerns the management of the supply of power over data lines, particularly in accordance with the draft standard IEEE 802.3af. In this example the invention is implemented by a computer program and data structure which extend the functions of the prescribed standard.

In a practical scheme, a switch having a power management scheme in accordance with the invention can be used in place of a current network switch yet provides the advantage of directly supporting 'power over Ethernet'.

Figure 1:
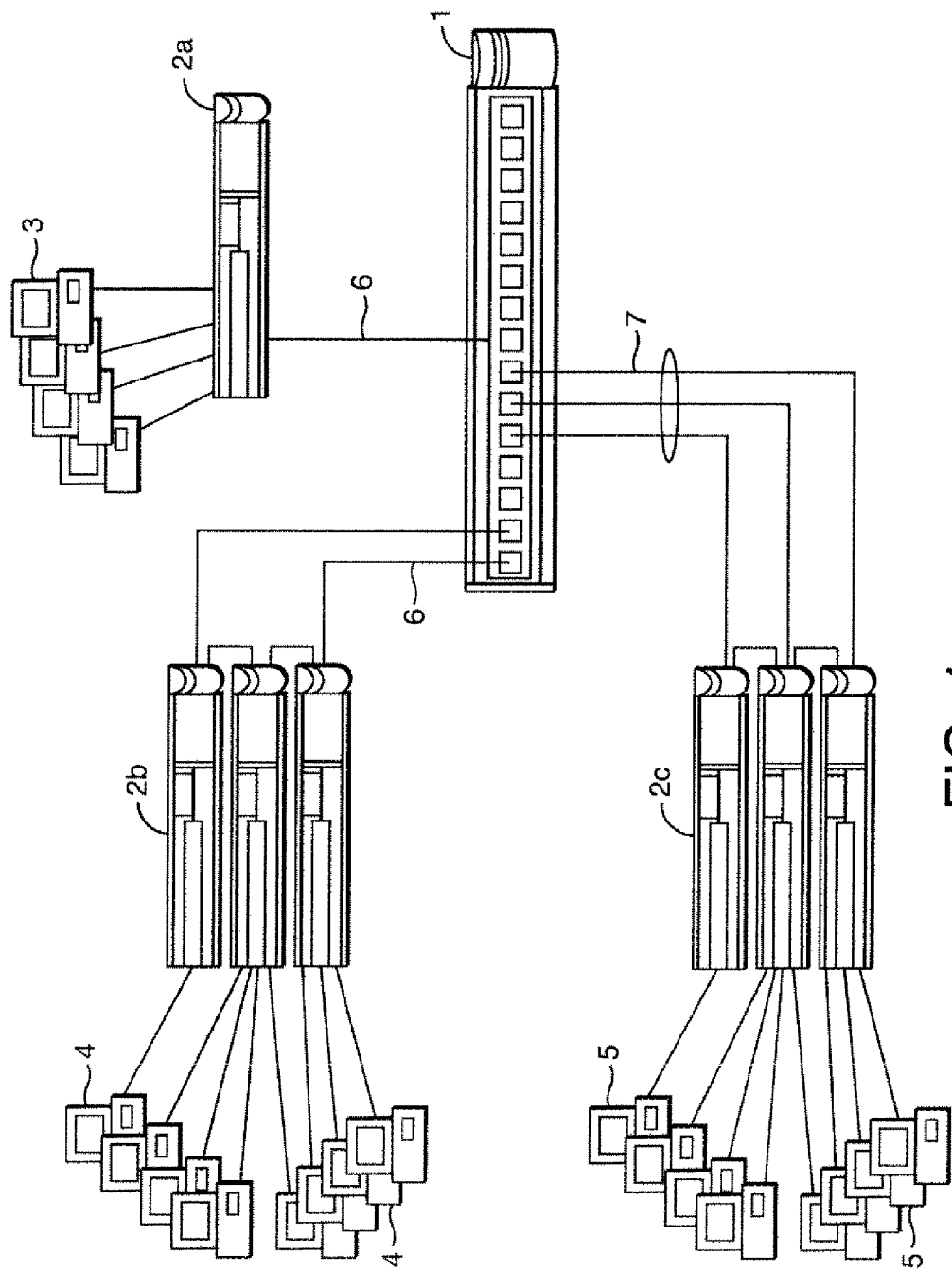
FIG. 1 is a schematic diagram of a network including switches in accordance with the invention.

FIG. 1 illustrates for the sake of example a 12-port core switch 1 connected by 1000 Base T link to a switch 2a which has ports connected to a group 3 of end-stations 3. The core switch 1 has a trunked 1000 Base T connection 6 to a 'stack' 2b of switches, which have a 1 Gps cascade connection and have ports connected to supply end-stations in a group 4. The core switch 1 is also connected by way of a 3 Gps link aggregation 7 to another stack 2c of switches which have ports supplying end-stations in a group 5. In the system shown in FIG. 1, the switch 2a and each switch in the stacks 2b and 2c has 'front panel' ports connected to end-stations and a down link port as a 'backbone' connection, which is either single (as for switch 2a) or resilient (as for the stack 2b) or aggregated (as for the stack 2c).

Figure 2:
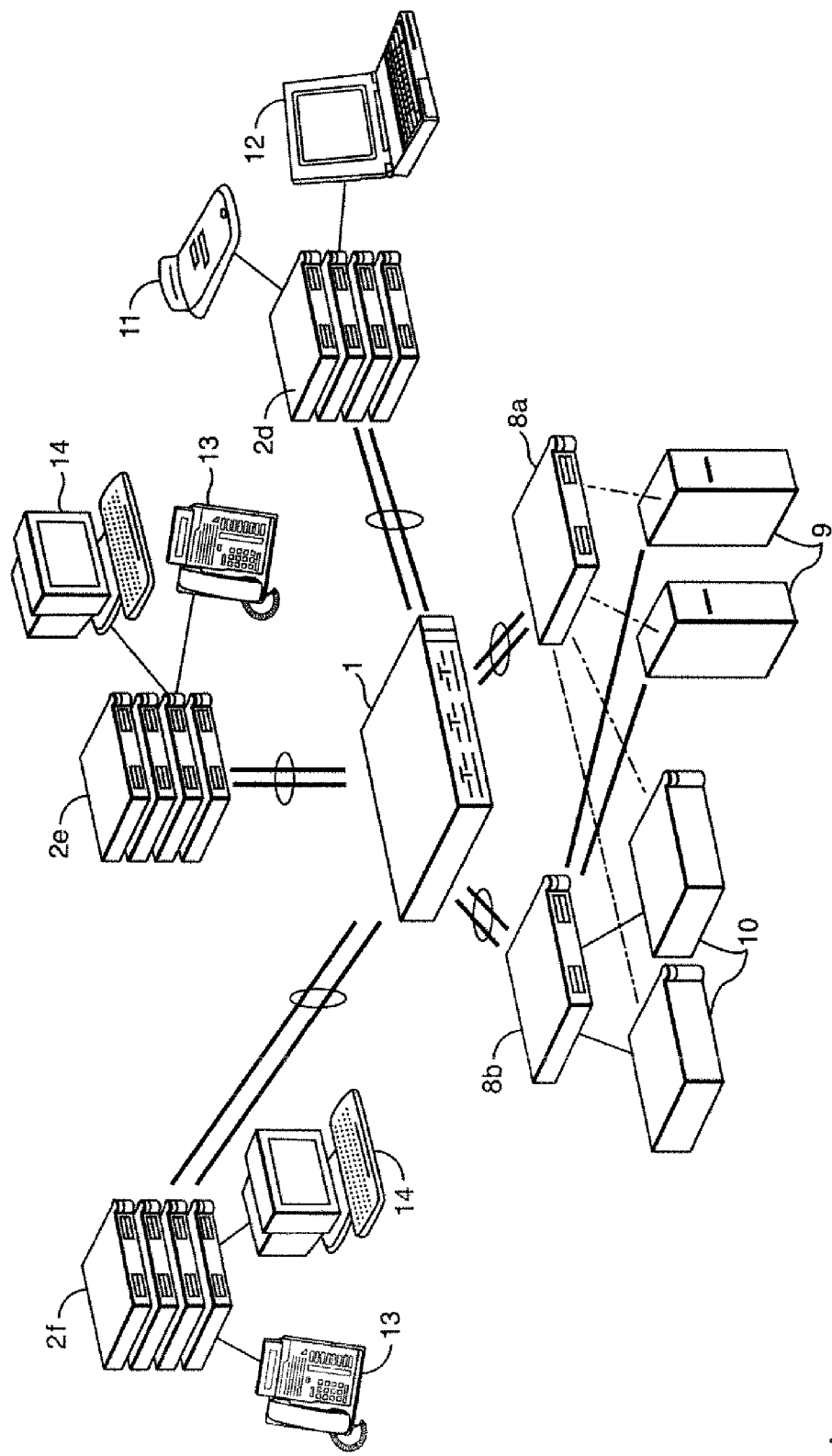
FIG. 2 is another schematic diagram of a network including switches in accordance with the invention.

FIG. 2 illustrates for the sake of example a network in which certain switches supply power over Ethernet links. A core switch, such as a 3Com switch type 4060, has aggregated connections to switches 8a and 8b (e.g. switch types 4924) connected to servers 9 and 'Super Stack' switches 10, e.g. type NBX V5000/NCP. Each switch type mentioned is commercially available.

The system shown in FIG. 2 includes three stacks 2d, 2e and 2f of switches which can supply 'power over Ethernet' to various devices, particularly a wireless access point 11 and NBX phones 13 and are also connected to independently powered end-stations 12 and 14.

Figure 3:
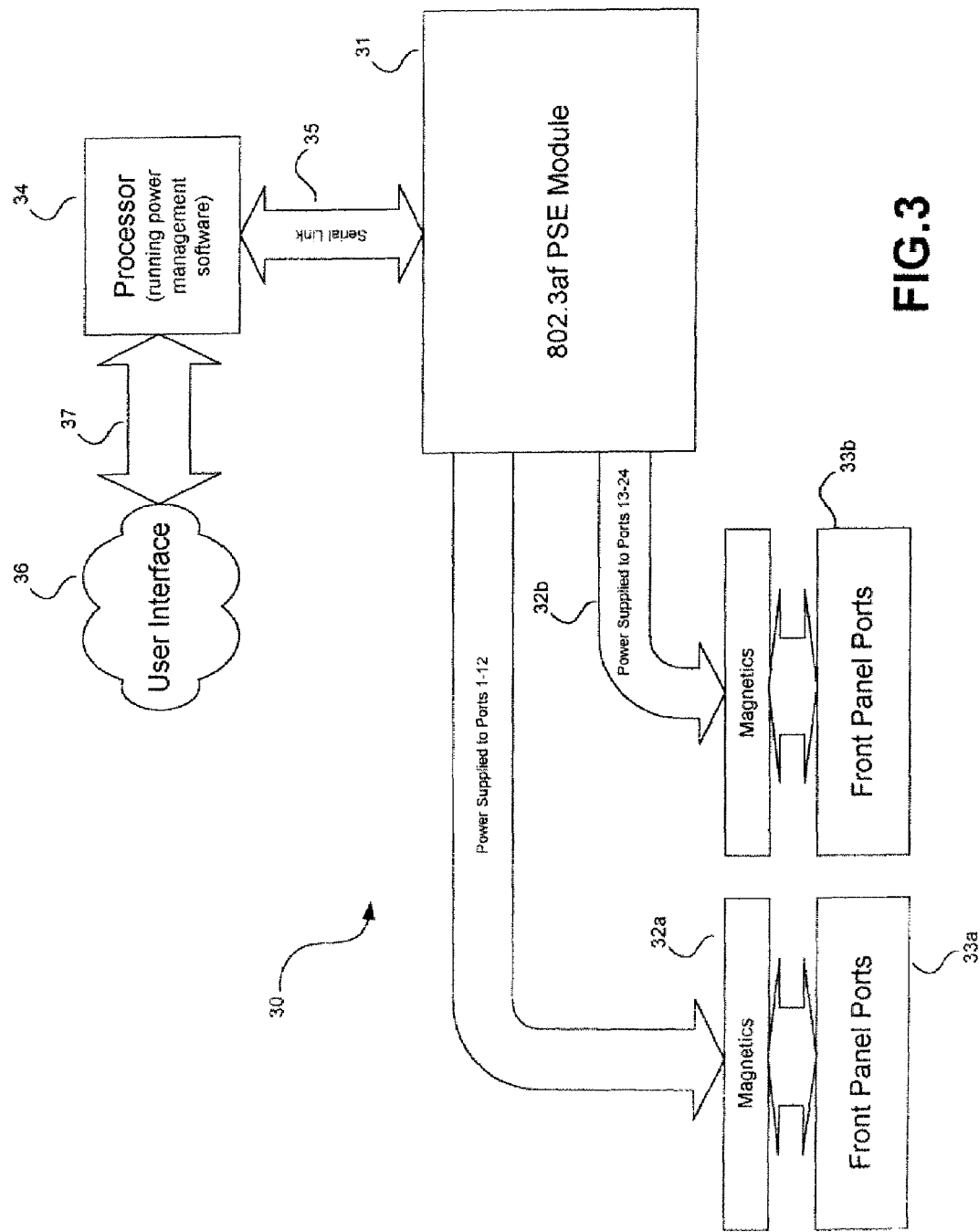
FIG. 3 is a schematic diagram of the power management elements of a switch in accordance with the invention.

FIG. 3 illustrates the principal elements relating to the management of 'power over Ethernet' from the ports of a network switch. For simplicity the packet-processing and storage elements of the switch have been omitted. It is presumed that the reader is familiar with such switches. For the sake of a brief description, the switch 30 includes 'front-panel' ports, shown here as in two groups 33a and 33b, which are capable of receiving and transmitting data packets over physical links (such as 'twisted pairs'). Received packets are temporarily stored while being subjected to an address-look-up to determine which port or ports are required to transmit the packets. One example of a commercially available switch is the 3Com switch type 4400.

As is shown in FIG. 3, the switch 30 includes a power supply module 31 which conforms to IEEE 802.3af. The module is controllable to supply power to the ports 33a and 33b by way of respective sets of transformer couplings, denoted magnetics 32a and 32b. The module communicates with a processor 34 by way of a serial link 35 and the processor is coupled to a user interface 36 by way of a data path 37. According to the Standard, up to 15.4 watts can be supplied to a port, at a nominal 48 volts.

Figure 4:
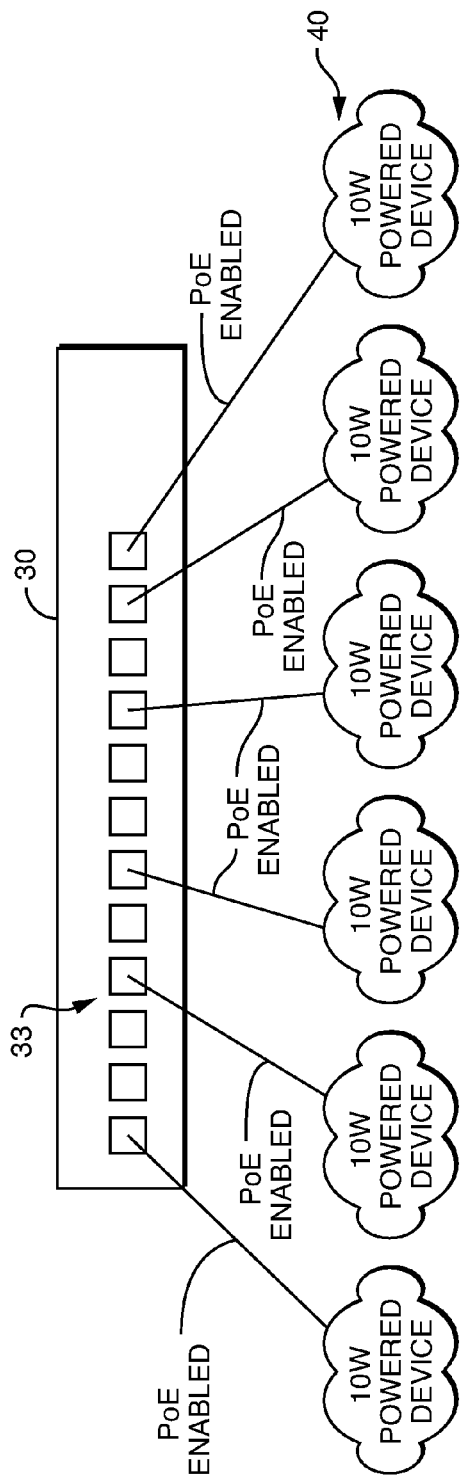
FIG. 4 illustrates one mode of supply of power to powered devices.

In practical systems the maximum power available from a PSE, such as module 31 is limited and is typically less than the maximum possible demand from the powered devices. FIG. 4 shows the ports 33 of switch 30 supplying power from a 50-watt PSE within switch 30 to six powered devices 40, each of which consumes up to 10 watts. One of the ports will cease to supply power, though which port this will be is not predictable.

Figure 5:
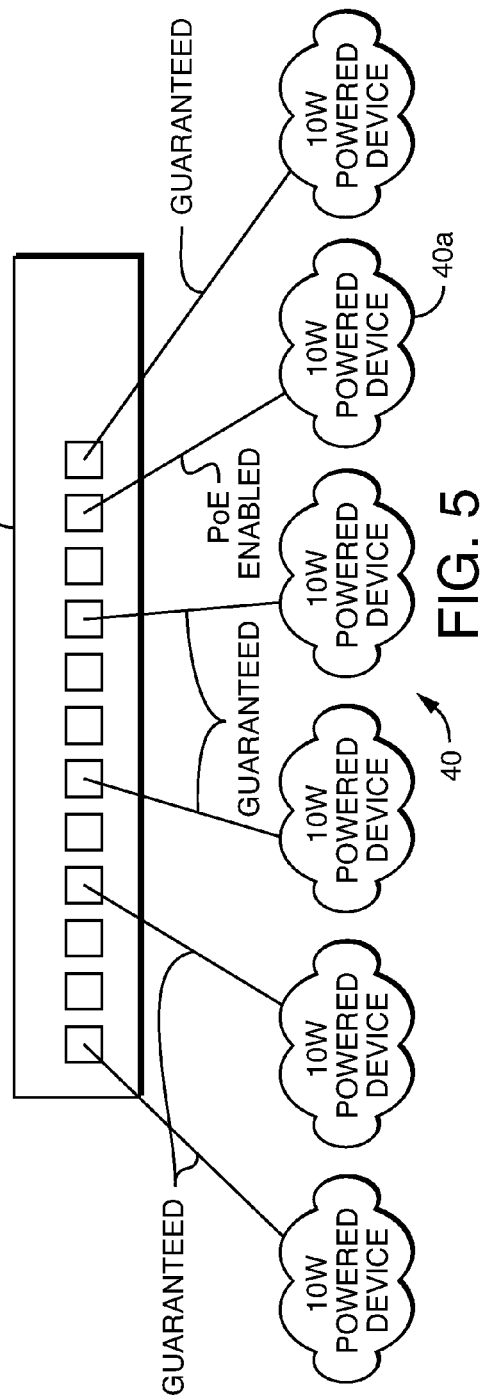
FIG. 5 illustrates another mode of supply of power to powered devices.

FIG. 5 illustrates a scheme in which certain of the ports 33 are 'guaranteed' power to a specified level and another is merely 'PoE' enabled. In the event of the total demand exceeding the power limit, it will be this port which is disabled, i.e. disconnected from the power supply, and power supply to the respective device 40a will cease.

Figure 6:
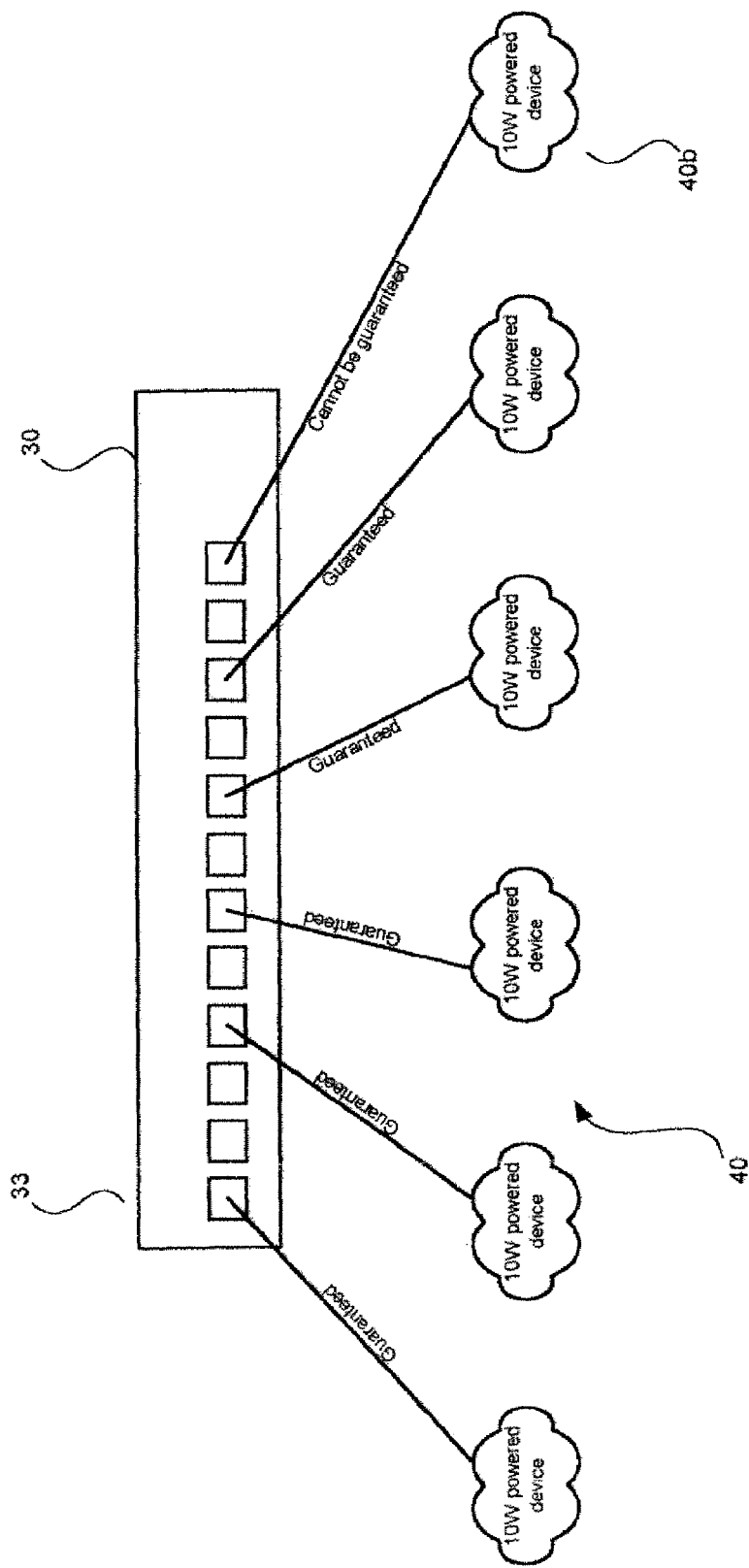
FIG. 6 illustrates another mode of supply of power to powered devices.

FIG. 6 illustrates a scheme in which a 50-watt PSE within switch 30 supplies via respective ports five of the 10-watt powered devices 40. These ports are guaranteed power; accordingly the sixth port (connected to device 40b) cannot be guaranteed because all the power pool would then be reserved. The present invention is particularly intended to provide a system of management in which power to selected ports can be guaranteed to a selected level, up to an overriding maximum, and the power supply to other ports is computed and controlled accordingly in a prioritised manner.

Figure 7:
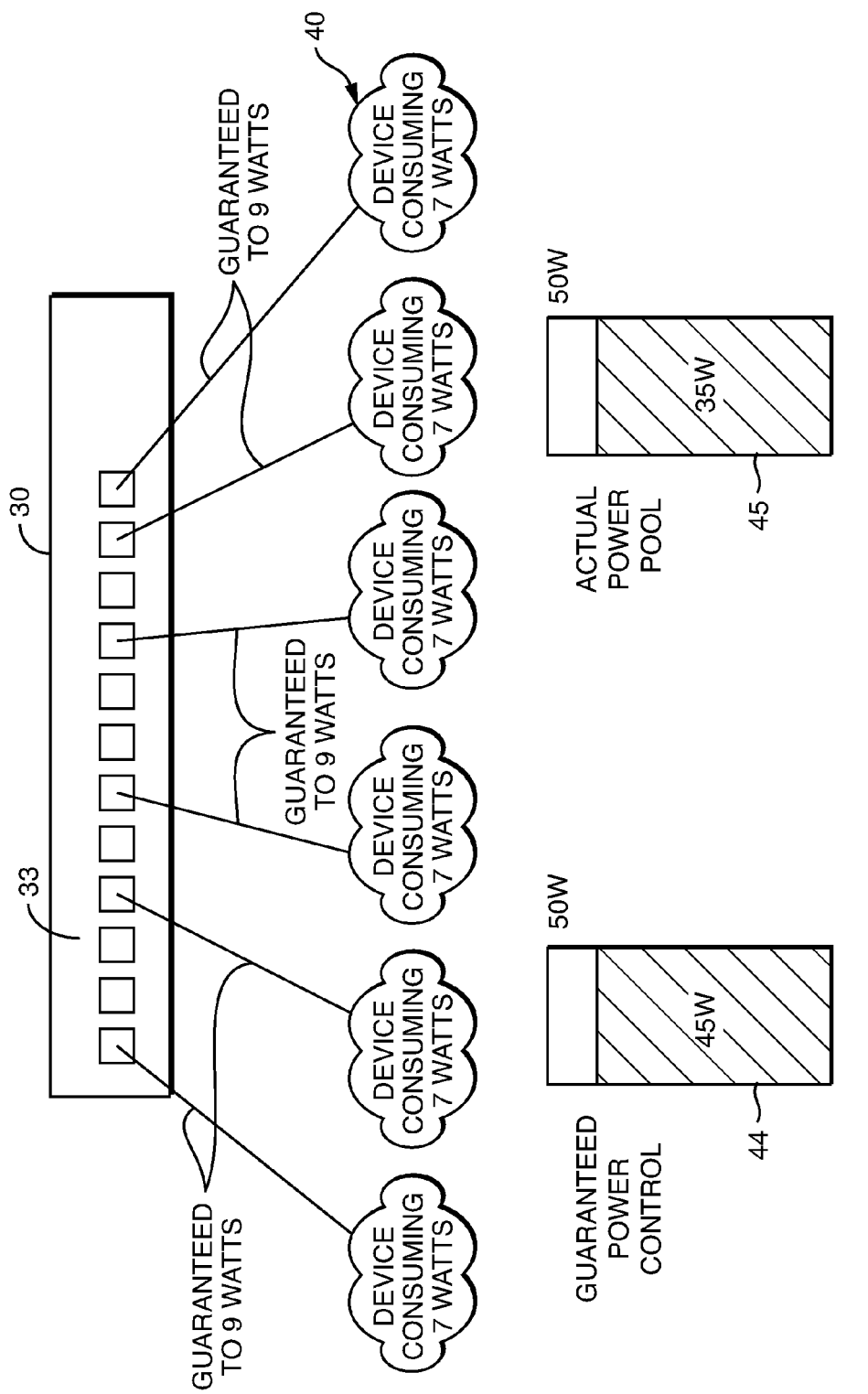
FIG. 7 illustrates the relationship between an actual power 'pool' and a 'guaranteed power 'pool'.

FIG. 7 illustates a scheme in which five of the port 33 are guaranteed to supply 9 watts each to a respective device. This make the 'guaranteed power pool' 44 a totoal of 45 watts. Since in this example the maximum power available from the module 30 is 50 watts, another port may not be guaranteed another 9 watts, even though the devices are only consuming 7 watts each, i.e. the actual power pool is only 35 watts. An extra device may be connected to another one of the ports 33, but it would have to remain in the 'power enabled' mode and would be at risk of disconnection.

Figure 8:
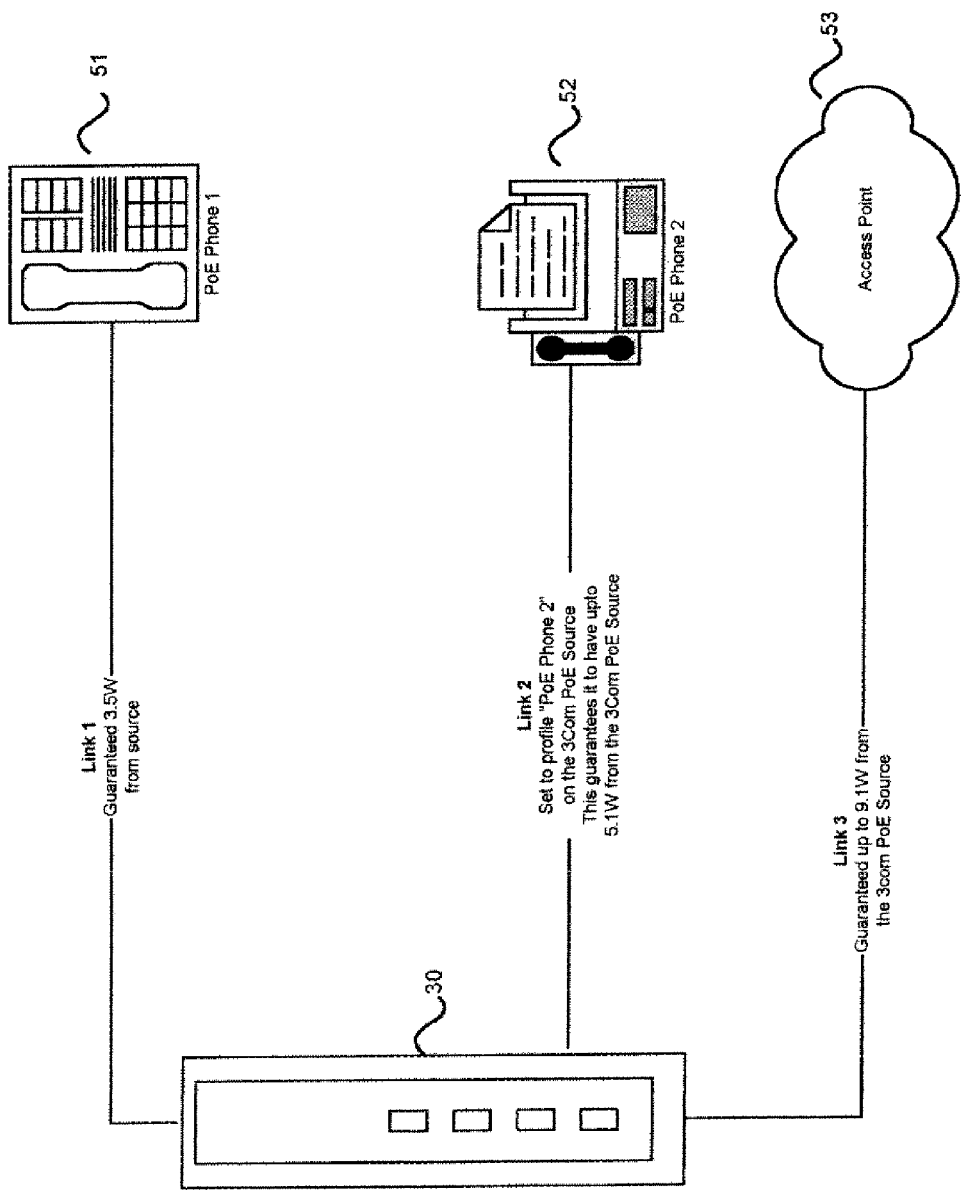
FIG. 8 illustrates the managed supply of power to a powered device.

FIG. 8 illustrates one simple example of a system according to the invention in operation. In this example the power over Ethernet source within switch 30 is supplying via respective ports power to three devices 51, 52 and 53.

Device 51 is a telephone which is a guaranteed selected 3.5 watts from the source over Ethernet link 1.

Device 52 is another telephone; in this case the 'power profile' is known to the switch 30, the parameters or values defining this profile being stored and accessed when the type of the telephone 52 is detected. The predetermined power profile sets the guaranteed power level for the link; in this example the power profile sets the guaranteed power level at 5.1 watts.

Device 53 is, for example, a wireless access point. The power level guaranteed for the access point is selected and in this example is 9.1 watts.

The aggregate guaranteed power in this example is (3.5+5.1+9.1)=17.7 watts. The difference between this and the maximum power available from the PSE and the requirements of devices connected to other ports will determine how much power can be guaranteed to other ports and supplied, but not necessarily guaranteed to other ports, as just described.

Figure 9:
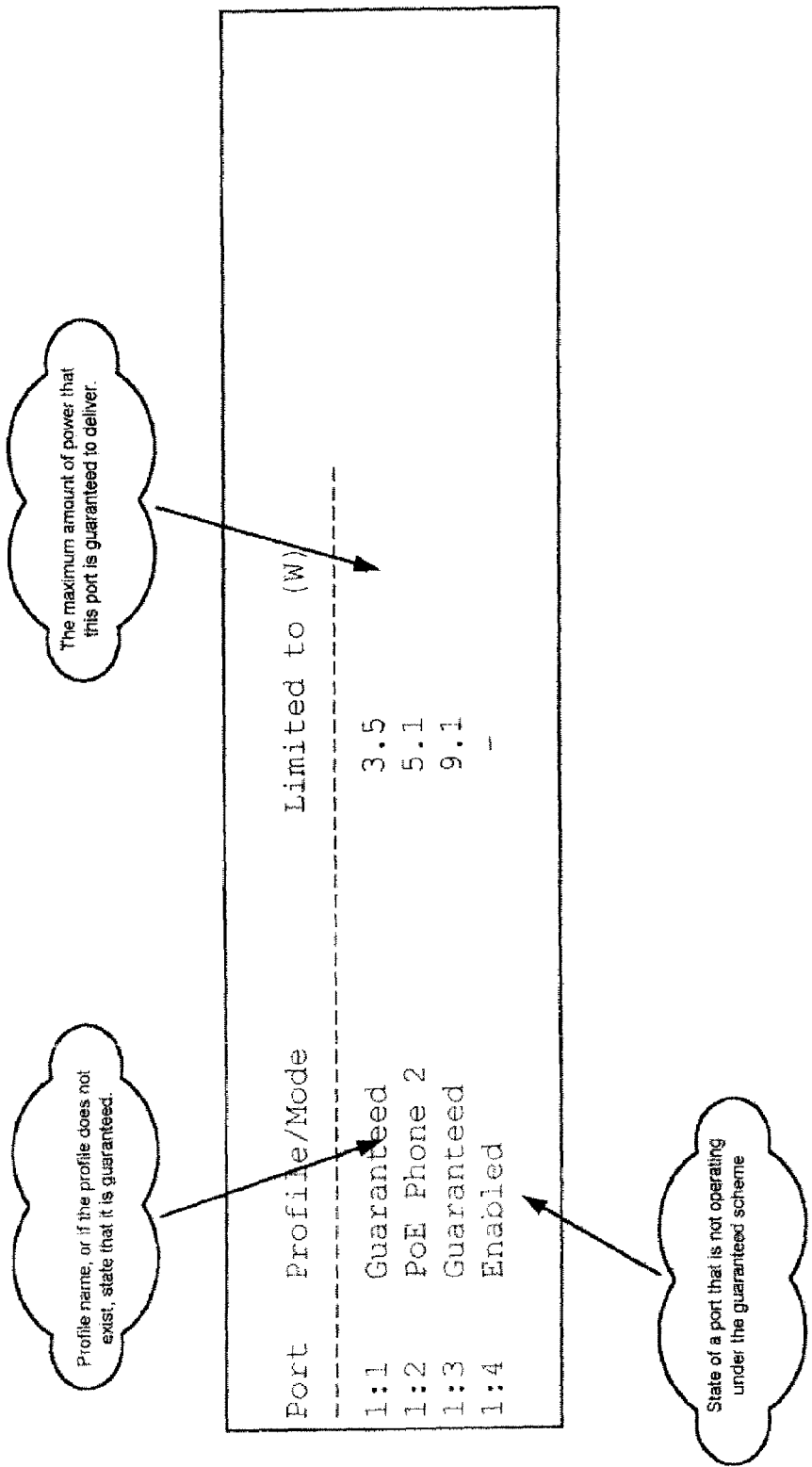
FIG. 9 illustrates a form of display according to the invention.

FIG. 9 shows one form of display that can be used with the invention. Each port, identified in the first column has a displayed mode (which may show a profile name) and the maximum power that the port is guaranteed to deliver.

Modes

The system allows the ports to be in various modes as follows.

Power Disabled

PoE operation may be enabled and disabled independently on each port via management.

Power Enabled

In this mode any port can draw up to the prescribed limit, i.e. 15.4 watts. When the PoE power budget of the switch is exceeded power is not guaranteed to the PoE port. If a port increases its power requirements or a guaranteed port (i.e. higher priority port) is connected, causing the total power budget for the switch to be exceeded, one or more ports in Power Enabled mode will be disconnected until the switch is back within its power budget. The Power Enabled port with (in this example) the highest front panel port number will be disconnected first (i.e. port 24 will be disconnected in preference to port 23 etc. down to port 1). In the absence of guaranteed power ports, this scheme allows a user to prioritise his users by putting important users onto low numbered ports.

Guaranteed Power Mode

This mode allows the power that can be drawn on a port to be guaranteed. The maximum power that the port can supply is defined through management up to a maximum of 15.4 watts. Enough power will kept in reserve to supply all ports in this mode up to their guaranteed power limit. If any port tries to draw more power than its maximum guaranteed power limit the system will stop delivering power to the port. Power delivery to the port will resume once again falls within its maximum guaranteed power limit.

In one example, the system will prevent the sum total of all the guaranteed powers exceeding the overall guaranteed power pool of 130 watts. If a user tries to guarantee more power than this limit, a warning will be returned to the user and the guarantee power command ignored.

MIB Definitions

The invention in a practical form is partly constituted by MIB (Management Information Base) definitions. The basic MIB (with interspersed explanations) is as follows:

IMPORTS a3ComPoe-mib

FROM A3Com-products-MIB

TRAP-TYPE

FROM RFC-1215

OBJECT-TYPE

FROM RFC-1212

Integer32, Gauge32

FROM SNMPv2-SMI;

-- Redefinition of TruthValue to ensure SNMPv1 compliance.

TruthValue ::= INTEGER { true(1), false(2) }

--      DESCRIPTION

--          "The MIB module for managing Powered Devices (PD) or

--          Power Source Equipment (PSE) working according to the IEEE

--          802.af Power Ethernet (DTE Power via MDI) standard.

--

--          The following terms are used throughout this

--          MIB module. For complete formal definitions,

--          the IEEE 802.3 standards should be consulted

--          wherever possible:

--

--          Group - A recommended, but optional, entity

IMPORTS a3ComPoe-mib

FROM A3Com-products-MIB

TRAP-TYPE

FROM RFC-1215

OBJECT-TYPE

FROM RFC-1212

Integer32, Gauge32

FROM SNMPv2-SMI;

-- Redefinition of TruthValue to ensure SNMPv1 compliance.
TruthValue ::= INTEGER { true(1), false(2) }

--     DESCRIPTION

--     "The MIB module for managing Powered Devices (PD) or

--     Power Source Equipment (PSE) working according to the IEEE

--     802.af Power Ethernet (DTE Power via MDI) standard.

--

--     The following terms are used throughout this

--     MIB module. For complete formal definitions,

--     the IEEE 802.3 standards should be consulted

--     wherever possible:

--

--     Group - A recommended, but optional, entity

```
--          defined by the IEEE 802.3 management standard,
--          in order to support a modular numbering scheme.
--          The classical example allows an implementor to
--          represent field-replaceable units as groups of
--          ports, with the port numbering matching the
--          modular hardware implementation.
--
--          Port - This entity identifies the port within the group
--          for which this entry contains information. The numbering
--          scheme for ports is implementation specific.

a3ComPowerEthernetObjects    OBJECT IDENTIFIER ::= { a3ComPoe-mib 1 }

-- PSE Objects a3ComPethPsePortTable OBJECT-TYPE
    SYNTAX    SEQUENCE OF A3ComPethPsePortEntry
    ACCESS    not-accessible
    STATUS    mandatory
    DESCRIPTION
        "A table of objects that display and control the power
        characteristics power Ethernet ports on a Power Source
        Entity (PSE) device. This group will be implemented in
        managed power Ethernet switches and mid-span devices."
    ::= { a3ComPowerEthernetObjects 1 } a3ComPethPsePortEntry OBJECT-TYPE
    SYNTAX    A3ComPethPsePortEntry
    ACCESS    not-accessible
    STATUS    mandatory
    DESCRIPTION
        "A set of objects that display and control the power
``` characteristics of a power Ethernet PSE port."

INDEX   { a3ComPethPsePortGroupIndex , a3ComPethPsePortIndex }

::= { a3ComPethPsePortTable 1 }

A3ComPethPsePortEntry ::= SEQUENCE {
  a3ComPethPsePortGroupIndex
    INTEGER,
  a3ComPethPsePortIndex
    INTEGER,
  a3ComPethPsePortAdminEnable
    INTEGER,
  a3ComPethPsePortPowerPairsControlAbility
    TruthValue,
  a3ComPethPsePortPowerPairs
    INTEGER,
  a3ComPethPsePortPowerDetectionControl
    INTEGER,
  a3ComPethPsePortDetectionStatus
    INTEGER,
  a3ComPethPsePortPowerPriority
    INTEGER,
  a3ComPethPsePortCurrentStatus
    INTEGER,
  a3ComPethPsePortCurrentStatusClear
    INTEGER,
  a3ComPethPsePortType
    INTEGER,
  a3ComPethPsePortPowerClassifications
    INTEGER
} a3ComPethPsePortGroupIndex OBJECT-TYPE

SYNTAX    INTEGER (1..2147483647)

ACCESS    not-accessible

STATUS    mandatory

DESCRIPTION

"This variable uniquely identifies the group containing the port to which power Ethernet PSE is connected.

Group means (box in the stack, module in a rack) and the value 1

MUST be used for non-modular devices "

::= { a3ComPethPsePortEntry 1 } a3ComPethPsePortIndex OBJECT-TYPE

SYNTAX    INTEGER(1..2147483647)

ACCESS    not-accessible

STATUS    mandatory

DESCRIPTION

"This variable uniquely identifies the power Ethernet PSE port within group a3ComPethPseGroupIndex to which the power Ethernet PSE entry is connected."

::= { a3ComPethPsePortEntry 2 } a3ComPethPsePortAdminEnable OBJECT-TYPE

SYNTAX INTEGER  { enable(1), disable(2)

}

ACCESS    read-write

STATUS mandatory

DESCRIPTION

"Enables power supply on this port.

Setting this object at a value enable(1) enables power and detection mechanism for this port.

Setting this object at a value disable(2) disables power for this port."
::= { a3ComPethPsePortEntry 3 } a3ComPethPsePortPowerPairsControlAbility OBJECT-TYPE
SYNTAX TruthValue
ACCESS   read-only
STATUS mandatory
DESCRIPTION
   "Describes the capability of controlling the power pairs
   functionality to switch pins for sourcing power.
   The value true indicate that the device has the capability
   to control the power pairs"
::= { a3ComPethPsePortEntry 4 } a3ComPethPsePortPowerPairs OBJECT-TYPE
SYNTAX INTEGER   {
     signal(1),
     spare(2)
}
ACCESS   read-only
STATUS mandatory
DESCRIPTION
   "Describes or controls the pairs in use. If the value of
   a3ComPethPsePortPowerPairsControl is true, this object is
   writable.
   A value of signal(1) means that the signal pairs
   only are in use.
   A value of spare(2) means that the spare pairs
   only are in use."
::= { a3ComPethPsePortEntry 5 } a3ComPethPsePortPowerDetectionControl OBJECT-TYPE

```
SYNTAX INTEGER {
        auto(1),
        test(2)
}
ACCESS   read-write
STATUS mandatory
DESCRIPTION
   "Controls the power detection mechanism of the port.
   Setting the value auto(1) enables the power detection
   mechanism of the port.
   Setting the value test(2) puts the port in a
   testmode: force continuous discovery without applying
   power regardless of whether PD detected."
::= { a3ComPethPsePortEntry 6 } a3ComPethPsePortDetectionStatus OBJECT-TYPE
SYNTAX INTEGER {
        disabled(1),
        searching(2),
        detected(3),
        deliveringPower(4),
        fault(5),
        invalidPD(6),
        test(7),
        denyLowPriority(8)
}
ACCESS   read-only
STATUS mandatory
DESCRIPTION
   "Describes the operational status of the port PD detection.
   A value of disabled(1) indicates that the PD Detection function has
   been disabled.
```

A value of searching(2) indicates that the PD Detection function is enabled and is searching for a valid PD.

A value of detected(3) indicates that the PD Detection function has detected a valid PD but the PSE is not supplying power.

A value of deliveringPower(4) indicates that the port executed the detection algorithm, found a PD connection and is currently delivering power.

A value of fault(5) indicates that a fault was detected on the port, faults detected are vendor-specific.

A value of invalidPD(6) indicates that the PD Detection function has detected a invalid PD.

A value of test(7) indicates that the PD Detection function has been placed in test mode.

A value of denyLowPriority(8) indicates that the port was disabled by the power management system, in order to keep active higher priority ports.

"

::= { a3ComPethPsePortEntry 7 } a3ComPethPsePortPowerPriority OBJECT-TYPE
SYNTAX INTEGER {
    critical(1),
    high(2),
    low(3)
}
ACCESS   read-write
STATUS mandatory
DESCRIPTION "This object controls the priority of the port from the point of view of a power management algorithm. The priority that is set by this variable could be used by a control mechanism that prevents over current situations by disconnecting first ports with lower power priority. Ports that connect devices
critical to the operation of the network - like the E911
telephones ports - should be set to higher priority."
::= { a3ComPethPsePortEntry 8 } a3ComPethPsePortCurrentStatus OBJECT-TYPE
SYNTAX INTEGER {
    ok(1),
    underCurrent(2),
    overCurrent(3),
    both(4)
}
ACCESS   read-only
STATUS mandatory
DESCRIPTION
  "Describes a current port status related to the power generation
  The value ok(1) indicates that neither an undercurrent or an overcurrent
  condition was detected since the attribute was last cleared.
  The value underCurrent(2) indicates that the port current
  is below the minimal value since the attribute was last cleared.
  The value overCurrent(3) indicates that the port current
  exceeds the maximal value since the attribute was last cleared.
  The value both(4) indicates that both underCurrent and overCurrent
  since the attribute was last cleared.
  This attribute is cleared through the a3ComPethPsePortCurrentStatusClear
  action.

An undercurrent condition is detected when the current drawn from
  the PSE at the MDI is less than Off-mode current 2 for a duration greater than
  Under load time limit.

An overcurrent condition is detected when the current drawn from the

PSE at the MDI is greater than the overload current limit
for a duration greater than the Overload time limit.
These items are defined in the "IEEE DRAFT STANDARD FOR DTE POWER VIA MDI P802.3af/D1.2"
::= { a3ComPethPsePortEntry 10 } a3ComPethPsePortCurrentStatusClear OBJECT-TYPE
SYNTAX INTEGER {
    clear(1),
    off(2)
}
ACCESS   read-write
STATUS mandatory
DESCRIPTION
  "Setting the value of this object to clear(1) clears the value
  of the a3ComPethPsePortStatus and enable the agent to update the
  a3ComPethPsePortStatus.
  Read operation this value will be off(2)."
::= { a3ComPethPsePortEntry 11 } a3ComPethPsePortType OBJECT-TYPE
SYNTAX INTEGER {
    other(1),
    telephone(2),
    webcam(3),
    wireless(4)
}
ACCESS   read-write
STATUS mandatory
DESCRIPTION
  "A manager will set the value of this variable to a value
  that indicates the type of the device that is connected to the port. This value can be the result of the mapping the address of the station connected to the port and of the value of the a3ComPethPdPortType of the respective PD port."

::= { a3ComPethPsePortEntry 12 } a3ComPethPsePortPowerClassifications OBJECT-TYPE

SYNTAX INTEGER { class0(1), class1(2), class2(3), class3(4), class4(5), class5(6)

}

ACCESS   read-only

STATUS mandatory

DESCRIPTION

"Classification is a way to tag different terminals on the

Power over LAN network according to their power consumption.

Devices such as IP telephones, WLAN access points and others, will be classified according to their power requirements.

A read-only value that indicates the PD Class of a detected PD as specified in IEEE Draft P802.3af/D2.1 Supplement to IEEE Std.802.3

November 14 2001 clause 33.2.5 and 33.2.6.

The value is only valid while a valid PD is being detected as indicated by the attribute a3ComPethPsePortDetectionStatus reporting the enumeration (detected) or (deliveringPower)."

::= { a3ComPethPsePortEntry 13 }

-- Main PSE Objects a3ComPethMainPseObjects    OBJECT    IDENTIFIER   ::=   { a3ComPowerEthernetObjects 3 } a3ComPethMainPseTable OBJECT-TYPE
    SYNTAX    SEQUENCE OF A3ComPethMainPseEntry
    ACCESS    not-accessible
    STATUS    mandatory
    DESCRIPTION
        "A table of objects that display and control the Main power
        on a PSE device. Example internet switch midspan device can
        control an Internet port and the Main Power supply unit's."
    ::= { a3ComPethMainPseObjects 1 } a3ComPethMainPseEntry OBJECT-TYPE
    SYNTAX    A3ComPethMainPseEntry
    ACCESS    not-accessible
    STATUS    mandatory
    DESCRIPTION
        "A set of objects that display and control the Main power
        of a PSE. "
    INDEX   { a3ComPethMainPseGroupIndex }
    ::= { a3ComPethMainPseTable 1 }

A3ComPethMainPseEntry ::= SEQUENCE {
    a3ComPethMainPseGroupIndex
        INTEGER,
    a3ComPethMainPsePower
        Integer32,
    a3ComPethMainPseOperStatus
        INTEGER,
    a3ComPethMainPseConsumptionPower
        Gauge32, a3ComPethMainPseBackupPresent

INTEGER, a3ComPethMainPseBackupActivated

TruthValue, a3ComPethMainPseUsageThreshold

INTEGER, a3ComPethMainPseMaximumDcPower

INTEGER

} a3ComPethMainPseGroupIndex OBJECT-TYPE

SYNTAX    INTEGER (0..65535)

ACCESS    not-accessible

STATUS    mandatory

DESCRIPTION

"This variable uniquely identifies the group to which power Ethernet PSE is connected. Group means (box in the stack, module in a rack) and the value 1 MUST be used for non-modular devices "

::= { a3ComPethMainPseEntry 1 } a3ComPethMainPsePower OBJECT-TYPE

SYNTAX    Integer32 (0..65535)

ACCESS    read-only

STATUS    mandatory

DESCRIPTION

"The nominal power of the PSE expressed in watts."

::= { a3ComPethMainPseEntry 2 } a3ComPethMainPseOperStatus OBJECT-TYPE

SYNTAX INTEGER { on(1), off(2), faulty(3)

}

ACCESS read-only

STATUS mandatory

DESCRIPTION

"The operational status of the main PSE."

::= { a3ComPethMainPseEntry 3 } a3ComPethMainPseConsumptionPower OBJECT-TYPE

SYNTAX Gauge32

ACCESS read-only

STATUS mandatory

DESCRIPTION

"Measured usage power expressed in watts."

::= { a3ComPethMainPseEntry 4 } a3ComPethMainPseBackupPresent OBJECT-TYPE

SYNTAX INTEGER { present(1), notPresent(2), faulty(3)

}

ACCESS read-only

STATUS mandatory

DESCRIPTION

"reflects the presence of a backup PSE ."

::= { a3ComPethMainPseEntry 5 } a3ComPethMainPseBackupActivated OBJECT-TYPE

SYNTAX TruthValue

ACCESS read-only

STATUS      mandatory

DESCRIPTION

"Reflects the activation status of the backup PSE.

The value true Backup is activated."

::= { a3ComPethMainPseEntry 6 } a3ComPethMainPseUsageThreshold OBJECT-TYPE

SYNTAX     INTEGER (1..99)

ACCESS     read-write

STATUS     mandatory

DESCRIPTION

"The usage threshold expressed in percens for comparing the measured power and initiating an alarm if the threshold is exceeded."

::= { a3ComPethMainPseEntry 7 } a3ComPethMainPseMaximumDcPower OBJECT-TYPE

SYNTAX        INTEGER

ACCESS        read-write

STATUS        mandatory

DESCRIPTION

"Describes the maximum available power in

Watt to be supplied by the DC backup source to this device."

::= { a3ComPethMainPseEntry 8 }

-- Traps Control Objects a3ComPethTrapsControl               OBJECT   IDENTIFIER   ::=   { a3ComPowerEthernetObjects 4 } a3ComPethTrapsControlTable OBJECT-TYPE

```
    SYNTAX     SEQUENCE OF A3ComPethTrapsControlEntry
    ACCESS     not-accessible
    STATUS     mandatory
    DESCRIPTION
        "A table of objects that display and control the Traps
        on a PSE device."
    ::= { a3ComPethTrapsControl 1 } a3ComPethTrapsControlEntry OBJECT-TYPE
    SYNTAX     A3ComPethTrapsControlEntry
    ACCESS     not-accessible
    STATUS     mandatory
    DESCRIPTION
        "A set of objects that control the Trap events."
    INDEX   { a3ComPethTrapsControlGroupIndex }
    ::= { a3ComPethTrapsControlTable 1 }

A3ComPethTrapsControlEntry ::= SEQUENCE {
    a3ComPethTrapsControlGroupIndex
        INTEGER,
    a3ComPethTrapsControlEnable
        INTEGER
}
a3ComPethTrapsControlGroupIndex OBJECT-TYPE
    SYNTAX     INTEGER (0..65535)
    ACCESS     not-accessible
    STATUS     mandatory
    DESCRIPTION
        "This variable uniquely identifies the group. Group means
        box in the stack, module in a rack and it is recommended
        that the value 1 MUST be used for non-modular devices "
    ::= { a3ComPethTrapsControlEntry 1 }
``` a3ComPethTrapsControlEnable OBJECT-TYPE
SYNTAX INTEGER
{
enable(1),
disable(2)
}
ACCESS read-write
STATUS mandatory
DESCRIPTION
"Enable Traps from Agent"
::= { a3ComPethTrapsControlEntry 2 } a3ComPsePortDetectionStatusTrap TRAP-TYPE
ENTERPRISE a3Com
VARIABLES { a3ComPethPsePortDetectionStatus }
DESCRIPTION " This trap indicate if Pse Port is delivering or not power to the PD."
::= 141 a3ComPsePortCurrentStatusTrap TRAP-TYPE
ENTERPRISE a3Com
VARIABLES { a3ComPethPsePortCurrentStatus }
DESCRIPTION
"This trap indicate Port Change Status and it will be
sent on every status change."
::= 142 a3ComPseBackUpActivatedTrap TRAP-TYPE
ENTERPRISE a3Com
VARIABLES { a3ComPethMainPseBackupActivated }
DESCRIPTION "This trap indicate BackUp is Activated or BackUp is released."

::= 143 a3ComPsePowerUsageOnTrap TRAP-TYPE

ENTERPRISE a3Com

VARIABLES { a3ComPethMainPseConsumptionPower }

DESCRIPTION

"This trap indicate PSE Threshold usage indication is on, the usage power is above the threshold."

::= 144 a3ComPsePowerUsageOffTrap TRAP-TYPE

ENTERPRISE a3Com

VARIABLES { a3ComPethMainPseConsumptionPower }

DESCRIPTION

"This trap indicate PSE Threshold usage indication off, the usage power is below the threshold.."

::= 145

END

The following concern additional MIB definaitions relevant to the present invention.

::= BEGIN

IMPORTS

OBJECT-TYPE FROM RFC-1212

TRAP-TYPE FROM RFC-1215

DisplayString FROM RFC1213-MIB a3ComPethPsePortGroupIndex,   a3ComPethPsePortIndex,
a3ComPethMainPseGroupIndex

FROM A3COM494-POWER-ETHERNET-MIB stackUnitSerialNumber FROM A3COM0352-STACK-CONFIG a3ComPowerEthernetExt FROM A3COM0004-GENERIC

;

-- Internal Definitions

PowerProfileId    ::= INTEGER (0..100)
RowStatus        ::= INTEGER {
    active (1),
    notInService (2),
    notReady (3),
    createAndGo (4),
    createAndWait (5),
    destroy (6)    }
        PowerMode    ::= INTEGER {
            powerDisabled (1),
            powerEnabled (2),
            powerGuaranteed (3),
            powerAutoGuaranteed (4) }

-- PSE Port Objects a3ComPsePortObjects
        OBJECT IDENTIFIER ::= { a3ComPowerEthernetExt 1 } a3ComPsePortTable OBJECT-TYPE
    SYNTAX    SEQUENCE OF A3ComPsePortEntry
    ACCESS    not-accessible
    STATUS    mandatory
    DESCRIPTION
    "A table of objects that display and control the power characteristics of power Ethernet ports on a Power Source Entity (PSE) device."

::= { a3ComPsePortObjects 1 } a3ComPsePortEntry OBJECT-TYPE
    SYNTAX    A3ComPsePortEntry
    ACCESS    not-accessible
    STATUS    mandatory
    DESCRIPTION
    "A set of objects that display and control the power
    characteristics of a power Ethernet PSE port"
    INDEX    { a3ComPethPsePortGroupIndex , a3ComPethPsePortIndex }
        ::= { a3ComPsePortTable 1 }

A3ComPsePortEntry ::= SEQUENCE {
    a3ComPethPsePortGroupIndex    INTEGER,
    a3ComPethPsePortIndex    INTEGER,
    a3ComPsePortPowerLimit    INTEGER,
    a3ComPsePortCurrentPowerUsage    INTEGER,
    a3ComPsePortAveragePowerUsage    INTEGER,
    a3ComPsePortPeakPowerUsage    INTEGER,
    a3ComPsePortFaultDescription    DisplayString (SIZE(0..255)),
    a3ComPsePortProfile    PowerProfileId
} a3ComPsePortPowerLimit OBJECT-TYPE
        SYNTAX    INTEGER (0..15400)
        ACCESS    read-write
        STATUS    mandatory
        DESCRIPTION
    "This variable allows a limit to be set on the power available
    from the port. Expressed in milliwatts"
    ::= { a3ComPsePortEntry 1 } a3ComPsePortCurrentPowerUsage OBJECT-TYPE
    SYNTAX   INTEGER (0..15400)
    ACCESS   read-only
    STATUS   mandatory
    DESCRIPTION "Indicates the power currently being consumed by the port in milliwatts"

::= { a3ComPsePortEntry 2 } a3ComPsePortAveragePowerUsage OBJECT-TYPE
    SYNTAX   INTEGER (0..15400)
    ACCESS   read-write
    STATUS   mandatory
    DESCRIPTION "Indicates the average power that has been consumed by the
    port in milliwatts. This is a running average, which is reset
    when physical link is lost. Writing any value to this object
    also resets this variable to zero"

::= { a3ComPsePortEntry 3 } a3ComPsePortPeakPowerUsage OBJECT-TYPE
    SYNTAX   INTEGER (0..15400)
    ACCESS   read-write
    STATUS   mandatory
    DESCRIPTION "Indicates the peak power that has been consumed by the port
    in milliwatts. Writing any value to this object resets this
    variable to zero, as does loss of physical link"

::= { a3ComPsePortEntry 4 } a3ComPsePortFaultDescription OBJECT-TYPE

SYNTAX    DisplayString (SIZE(0..255))

ACCESS    read-only

STATUS    mandatory

DESCRIPTION

"Supports the fault category of the Power-Ethernet MIB
a3ComPethPsePortDetectionStatus object. A textual description
containing more information about the nature of this fault
is provided by this object. Typically this will detail
the precise PoE hardware state which is causing the
a3ComPethPsePortDetectionStatus object to be in the 'fault' state."
::= { a3ComPsePortEntry 5 } a3ComPsePortProfile OBJECT-TYPE

SYNTAX    PowerProfileId

ACCESS    read-write

STATUS    mandatory

DESCRIPTION

"Indicates the power profile which is currently associated with this port. This object references the corresponding a3ComPsePortProfileIndex object in the power profiles
    table. A value of zero is a special case and indicates that
    no power profile is currently associated with this port"
::= { a3ComPsePortEntry 6 }

-- Main PSE Objects a3ComMainPseObjects
        OBJECT IDENTIFIER ::= { a3ComPowerEthernetExt 2 } a3ComMainPseTable OBJECT-TYPE

SYNTAX    SEQUENCE OF A3ComMainPseEntry

ACCESS    not-accessible

STATUS    mandatory

DESCRIPTION

"A table of objects that display and control the Main power on a PSE device"

::= { a3ComMainPseObjects 1 } a3ComMainPseEntry OBJECT-TYPE

SYNTAX    A3ComMainPseEntry

ACCESS    not-accessible

STATUS    mandatory

DESCRIPTION

"A set of objects that display and control the Main power of a PSE"

INDEX    { a3ComPethMainPseGroupIndex }

::= { a3ComMainPseTable 1 }

A3ComMainPseEntry ::= SEQUENCE { a3ComPethMainPseGroupIndex        INTEGER, a3ComMainPsePowerLimit        INTEGER, a3ComMainPseAveragePower        INTEGER, a3ComMainPsePeakPower        INTEGER, a3ComMainPseGuaranteedPowerRemaining INTEGER

} a3ComMainPsePowerLimit OBJECT-TYPE

SYNTAX    INTEGER (0..65535)

ACCESS    read-write

STATUS    mandatory

DESCRIPTION

"This variable limits the power available for PoE of the PSE. Expressed in watts"

::= { a3ComMainPseEntry 1 } a3ComMainPseAveragePower OBJECT-TYPE
    SYNTAX    INTEGER (0..65535)
    ACCESS    read-write
    STATUS    mandatory
    DESCRIPTION
    "Indicates the average power that has been consumed for PoE by the PSE. This is a running average which is reset when the PSE is power cycled. Writing any value to this object also sets this variable to zero. Expressed in watts"
    ::= { a3ComMainPseEntry 2 } a3ComMainPsePeakPower OBJECT-TYPE
    SYNTAX    INTEGER (0..65535)
    ACCESS    read-write
    STATUS    mandatory
    DESCRIPTION
    "Indicates the peak power that has been consumed for PoE by the PSE. Writing any value to this object also resets this variable to zero. Expressed in watts"
    ::= { a3ComMainPseEntry 3 } a3ComMainPseGuaranteedPowerRemaining OBJECT-TYPE
    SYNTAX    INTEGER (0..65535)
    ACCESS    read-only
    STATUS    mandatory
    DESCRIPTION
    "Indicates the amount of power left in the guaranteed power budget. Expressed in watts"
    ::= { a3ComMainPseEntry 4 }

-- Stackwide PSE Objects (Scalar Objects)

a3ComStackWidePseObjects
        OBJECT IDENTIFIER ::= { a3ComPowerEthernetExt 3 } a3ComPseAutoDetectionActive OBJECT-TYPE
    SYNTAX    INTEGER {
not_supported (1),
disabled (2),
enabled (3)
}
ACCESS    read-write
STATUS    mandatory
DESCRIPTION
"Specifies whether the device auto-detection feature is
active. If this object is set to enabled, and a known
powered device is detected, then the port will automatically
switch to Auto-Guaranteed mode"
::= { a3ComStackWidePseObjects 1 }

-- Power Profile PSE Objects a3ComPseProfilesObjects
        OBJECT IDENTIFIER ::= { a3ComPowerEthernetExt 4 } a3ComPseProfilesTable OBJECT-TYPE
    SYNTAX    SEQUENCE OF A3ComPseProfilesEntry
    ACCESS    not-accessible
    STATUS    mandatory
    DESCRIPTION
    "A table of objects representing a set of power profiles.
    Power profiles can be applied to PoE ports, which has the effect of automatically setting the priority, power limit and PoE enable MIB objects to the values specified in the power profile."

::= { a3ComPseProfilesObjects 1 } a3ComPseProfilesEntry OBJECT-TYPE
    SYNTAX    A3ComPseProfilesEntry
    ACCESS    not-accessible
    STATUS    mandatory
    DESCRIPTION
    "A set of objects that display and control the Main power of a PSE"
    INDEX   { a3ComPsePortProfileIndex }

::= { a3ComPseProfilesTable 1 }

A3ComPseProfilesEntry ::= SEQUENCE {
    a3ComPseProfileIndex      PowerProfileId,
    a3ComPseProfileName       DisplayString,
    a3ComPseProfilePowerMode   PowerMode,
    a3ComPseProfilePowerLimit  INTEGER,
    a3ComPseProfileRowStatus   RowStatus
} a3ComPseProfileIndex OBJECT-TYPE
        SYNTAX    PowerProfileId
        ACCESS    read-write
        STATUS    mandatory
        DESCRIPTION
    "The index of the profile. This uniquely allow the profile to be identified"
::= { a3ComPseProfilesEntry 1 } a3ComPseProfileName OBJECT-TYPE
  SYNTAX DisplayString (SIZE(1..15))
  ACCESS read-write
  STATUS mandatory
  DESCRIPTION
"Assigns the profile a name with which the settings can be associated with. For example, 'NBX Phone'"
::= { a3ComPseProfilesEntry 2 } a3ComPseProfilePowerMode OBJECT-TYPE
  SYNTAX PowerMode
  ACCESS read-write
  STATUS mandatory
  DESCRIPTION
"The power mode associated with this power profile. There are four possible power modes as follows: powerDisabled, powerEnabled, powerGuaranteed and powerAutoGuaranteed. When a power profile is applied to a PSE port, this value dictates the settings of the ports a3ComPethPsePortPowerPriority and a3ComPethPsePortAdminEnable objects"
::= { a3ComPseProfilesEntry 3 } a3ComPseProfilePowerLimit OBJECT-TYPE
  SYNTAX INTEGER (0..15400)
  ACCESS read-write
  STATUS mandatory
  DESCRIPTION
"The power limit to be applied to the ports a3ComPsePortPowerLimit object when the profile is applied to the PSE port. Typically used with the powerGuaranteed or powerAutoGuaranteed power modes, but may also used in powerEnabled mode. Expressed in milliwatts"

::= { a3ComPseProfilesEntry 4 } a3ComPseProfileRowStatus OBJECT-TYPE
    SYNTAX    RowStatus
    ACCESS    read-write
    STATUS    mandatory
    DESCRIPTION
    "The status of this classifier"
::= { a3ComPseProfilesEntry 5 }

--
*******************************************************************************
--
-- 3Com Power over Ethernet Traps
--
--
******************************************************************************* a3comPsePOST_Trap TRAP-TYPE
ENTERPRISE a3Com
VARIABLES { stackUnitSerialNumber }
DESCRIPTION
    "This trap is raised whenever there is a PoE POST (Power On Self Test) fault. The serial number of the faulty unit is provided with the trap. This is a major failure."
::= 128

END

Set out below are the extensions required for a preferred example of the invention.

```
IMPORTS
    OBJECT-TYPE FROM RFC-1212
TRAP-TYPE FROM RFC-1215
    DisplayString FROM RFC1213-MIB
    a3ComPethPsePortGroupIndex,        a3ComPethPsePortIndex,
a3ComPethMainPseGroupIndex
        FROM A3COM494-POWER-ETHERNET-MIB
    stackUnitSerialNumber FROM A3COM0352-STACK-CONFIG
    a3ComPowerEthernetExt FROM A3COM0004-GENERIC
    ;

-- Internal Definitions

PowerProfileId      ::= INTEGER (0..100)
RowStatus           ::= INTEGER {
        active (1),
        notInService (2),
        notReady (3),
        createAndGo (4),
        createAndWait (5),
        destroy (6)        }
            PowerMode    ::= INTEGER {
                        powerDisabled (1),
                        powerEnabled (2),
                        powerGuaranteed (3),
                        powerAutoGuaranteed (4) }

-- PSE Port Objects a3ComPsePortObjects
            OBJECT IDENTIFIER ::= { a3ComPowerEthernetExt 1 }
``` a3ComPsePortTable OBJECT-TYPE
   SYNTAX    SEQUENCE OF A3ComPsePortEntry
   ACCESS    not-accessible
   STATUS    mandatory
   DESCRIPTION
   "A table of objects that display and control the power
   characteristics of power Ethernet ports on a Power Source
   Entity (PSE) device."
   ::= { a3ComPsePortObjects 1 } a3ComPsePortEntry OBJECT-TYPE
   SYNTAX    A3ComPsePortEntry
   ACCESS    not-accessible
   STATUS    mandatory
   DESCRIPTION
   "A set of objects that display and control the power
   characteristics of a power Ethernet PSE port"
   INDEX   { a3ComPethPsePortGroupIndex , a3ComPethPsePortIndex }
        ::= { a3ComPsePortTable 1 }

A3ComPsePortEntry ::= SEQUENCE {
   a3ComPethPsePortGroupIndex    INTEGER,
   a3ComPethPsePortIndex    INTEGER,
   a3ComPsePortPowerLimit    INTEGER,
   a3ComPsePortCurrentPowerUsage    INTEGER,
   a3ComPsePortAveragePowerUsage    INTEGER,
   a3ComPsePortPeakPowerUsage    INTEGER,
   a3ComPsePortFaultDescription    DisplayString (SIZE(0..255)),
   a3ComPsePortProfile    PowerProfileId
} a3ComPsePortPowerLimit OBJECT-TYPE
    SYNTAX    INTEGER (0..15400)
    ACCESS    read-write
    STATUS    mandatory
    DESCRIPTION
"This variable allows a limit to be set on the power available
from the port. Expressed in milliwatts"
::= { a3ComPsePortEntry 1 } a3ComPsePortCurrentPowerUsage OBJECT-TYPE
    SYNTAX    INTEGER (0..15400)
    ACCESS    read-only
    STATUS    mandatory
    DESCRIPTION
"Indicates the power currently being consumed by the port in
milliwatts"
::= { a3ComPsePortEntry 2 } a3ComPsePortAveragePowerUsage OBJECT-TYPE
    SYNTAX    INTEGER (0..15400)
    ACCESS    read-write
    STATUS    mandatory
    DESCRIPTION
"Indicates the average power that has been consumed by the
        port in milliwatts. This is a running average, which is reset
        when physical link is lost. Writing any value to this object
        also resets this variable to zero"
::= { a3ComPsePortEntry 3 } a3ComPsePortPeakPowerUsage OBJECT-TYPE
    SYNTAX    INTEGER (0..15400)
    ACCESS    read-write STATUS mandatory
DESCRIPTION
"Indicates the peak power that has been consumed by the port
in milliwatts. Writing any value to this object resets this
variable to zero, as does loss of physical link"
::= { a3ComPsePortEntry 4 } a3ComPsePortFaultDescription OBJECT-TYPE
SYNTAX DisplayString (SIZE(0..255))
ACCESS read-only
STATUS mandatory
DESCRIPTION
"Supports the fault category of the Power-Ethernet MIB
a3ComPethPsePortDetectionStatus object. A textual description
containing more information about the nature of this fault
is provided by this object. Typically this will detail
the precise PoE hardware state which is causing the
a3ComPethPsePortDetectionStatus object to be in the 'fault' state."
::= { a3ComPsePortEntry 5 } a3ComPsePortProfile OBJECT-TYPE
SYNTAX PowerProfileId
ACCESS read-write
STATUS mandatory
DESCRIPTION
"Indicates the power profile which is currently associated
with this port. This object references the corresponding a3ComPsePortProfileIndex object in the power profiles
table. A value of zero is a special case and indicates that
no power profile is currently associated with this port"
::= { a3ComPsePortEntry 6 }

-- Main PSE Objects a3ComMainPseObjects
          OBJECT IDENTIFIER ::= { a3ComPowerEthernetExt 2 } a3ComMainPseTable OBJECT-TYPE
    SYNTAX    SEQUENCE OF A3ComMainPseEntry
    ACCESS    not-accessible
    STATUS    mandatory
    DESCRIPTION
    "A table of objects that display and control the Main power
    on a PSE device"
        ::= { a3ComMainPseObjects 1 } a3ComMainPseEntry OBJECT-TYPE
    SYNTAX    A3ComMainPseEntry
    ACCESS    not-accessible
    STATUS    mandatory
    DESCRIPTION
    "A set of objects that display and control the Main power
    of a PSE"
    INDEX    { a3ComPethMainPseGroupIndex }
        ::= { a3ComMainPseTable 1 }

A3ComMainPseEntry ::= SEQUENCE {
    a3ComPethMainPseGroupIndex    INTEGER,
    a3ComMainPsePowerLimit    INTEGER,
    a3ComMainPseAveragePower    INTEGER,
    a3ComMainPsePeakPower    INTEGER,
    a3ComMainPseGuaranteedPowerRemaining INTEGER
} a3ComMainPsePowerLimit OBJECT-TYPE

SYNTAX    INTEGER (0..65535)

ACCESS    read-write

STATUS    mandatory

DESCRIPTION

"This variable limits the power available for PoE of the PSE. Expressed in watts"

::= { a3ComMainPseEntry 1 } a3ComMainPseAveragePower OBJECT-TYPE

SYNTAX    INTEGER (0..65535)

ACCESS    read-write

STATUS    mandatory

DESCRIPTION

"Indicates the average power that has been consumed for PoE by the PSE. This is a running average which is reset when the PSE is power cycled. Writing any value to this object also sets this variable to zero. Expressed in watts"

::= { a3ComMainPseEntry 2 } a3ComMainPsePeakPower OBJECT-TYPE

SYNTAX    INTEGER (0..65535)

ACCESS    read-write

STATUS    mandatory

DESCRIPTION

"Indicates the peak power that has been consumed for PoE by the PSE. Writing any value to this object also resets this variable to zero. Expressed in watts"

::= { a3ComMainPseEntry 3 } a3ComMainPseGuaranteedPowerRemaining OBJECT-TYPE

```
SYNTAX    INTEGER (0..65535)
ACCESS    read-only
STATUS    mandatory
DESCRIPTION
"Indicates the amount of power left in the guaranteed power
    budget. Expressed in watts"
::= { a3ComMainPseEntry 4 }
```

-- Stackwide PSE Objects (Scalar Objects)

```
a3ComStackWidePseObjects
    OBJECT IDENTIFIER ::= { a3ComPowerEthernetExt 3 } a3ComPseAutoDetectionActive OBJECT-TYPE
    SYNTAX    INTEGER {
        not_supported (1),
        disabled (2),
        enabled (3)
    }
    ACCESS    read-write
    STATUS    mandatory
    DESCRIPTION
    "Specifies whether the device auto-detection feature is
    active. If this object is set to enabled, and a known
    powered device is detected, then the port will automatically
    switch to Auto-Guaranteed mode"
    ::= { a3ComStackWidePseObjects 1 }
```

-- Power Profile PSE Objects

```
a3ComPseProfilesObjects
    OBJECT IDENTIFIER ::= { a3ComPowerEthernetExt 4 }
``` a3ComPseProfilesTable OBJECT-TYPE
    SYNTAX    SEQUENCE OF A3ComPseProfilesEntry
    ACCESS    not-accessible
    STATUS    mandatory
    DESCRIPTION
    "A table of objects representing a set of power profiles. Power profiles can be applied to PoE ports, which has the effect of automatically setting the priority, power limit and PoE enable MIB objects to the values specified in the power profile."
        ::= { a3ComPseProfilesObjects 1 } a3ComPseProfilesEntry OBJECT-TYPE
    SYNTAX    A3ComPseProfilesEntry
    ACCESS    not-accessible
    STATUS    mandatory
    DESCRIPTION
    "A set of objects that display and control the Main power of a PSE"
    INDEX    { a3ComPsePortProfileIndex }
        ::= { a3ComPseProfilesTable 1 }

A3ComPseProfilesEntry ::= SEQUENCE {
    a3ComPseProfileIndex    PowerProfileId,
    a3ComPseProfileName    DisplayString,
    a3ComPseProfilePowerMode    PowerMode,
    a3ComPseProfilePowerLimit    INTEGER,
    a3ComPseProfileRowStatus    RowStatus
} a3ComPseProfileIndex OBJECT-TYPE

SYNTAX PowerProfileId
ACCESS read-write
STATUS mandatory
DESCRIPTION
"The index of the profile. This uniquely allow the profile
to be identified"
::= { a3ComPseProfilesEntry 1 } a3ComPseProfileName OBJECT-TYPE
SYNTAX DisplayString (SIZE(1..15))
ACCESS read-write
STATUS mandatory
DESCRIPTION
"Assigns the profile a name with which the settings can be
associated with. For example, 'NBX Phone'"
::= { a3ComPseProfilesEntry 2 } a3ComPseProfilePowerMode OBJECT-TYPE
SYNTAX PowerMode
ACCESS read-write
STATUS mandatory
DESCRIPTION
"The power mode associated with this power profile. There
are four possible power modes as follows: powerDisabled,
powerEnabled, powerGuaranteed and powerAutoGuaranteed.
When a power profile is applied to a PSE port, this value
dictates the settings of the ports a3ComPethPsePortPowerPriority
and a3ComPethPsePortAdminEnable objects"
::= { a3ComPseProfilesEntry 3 } a3ComPseProfilePowerLimit OBJECT-TYPE
SYNTAX INTEGER (0..15400)

Detailed Specification Description

This MIB has been designed assist the monitoring and control of power as defined in the IEEE 802.3af working standard.

The structure of the MIB is as follows:

```
PowerEthernetExtensions
    a3ComPsePortTable
        pethPsePortGroupIndex
            pethPsePortIndex
                a3ComPsePortPowerLimit
                a3ComPsePortCurrentPower
                a3ComPsePortAveragePower
                a3ComPsePortPeakPower
                a3ComPsePortFaultDescription
                a3ComPsePortProfile
    a3ComMainPseTable
        pethMainPseGroupIndex
            a3ComMainPsePowerLimit
            a3ComMainPseAveragePower
            a3ComMainPsePeakPower
            a3ComMainPseGuaranteedPowerRemaining
    a3ComPseAutoDetectionActive
    a3ComPsePowerProfileTable
        a3ComPseProfileIndex
            a3ComPseProfileName
            a3ComPsePortPowerMode
            a3ComPseProfilePowerLimit
            a3ComPsePortProfileRowStatus
```

PSE Port Objects

Note—The indexing scheme is taken from that used by the IETF Power MIB. The same indexing scheme is used to give continuity in behaviour between that standard and this definition.

Group Index

This object (pethPsePortGroupIndex) is imported from the IETF Power MIB and uniquely identifies the group containing the port to which power Ethernet PSE is connected. Group means (box in the stack, module in a rack).

Port Index

This object (pethPsePortPortIndex) is imported from the IETF Power MIB and uniquely identifies the power Ethernet PSE port within group pethPseGroupIndex to which the power Ethernet PSE entry is connected. This value will match the local port number on a 3Com switch.

Power Limit

The a3ComPsePortPowerLimit object specifies the power limit set for this port. The PSE will not supply more than this level of power to the specified port. It is a read/write integer value with units of milliwatts.

Current Power Usage

The a3ComPsePortCurrentPower object specifies the power currently being consumed by the port. It is a read only integer value with units of milliwatts.

Average Power Usage

The a3ComPsePortAveragePower object specifies the average power which has been consumed by the port. The average is calculated as follows:

$$\text{Average} = \frac{1}{n}\sum_{j=1}^{n} y_j$$

where n is the number of samples taken and $y_j$ represents each individual sample. Samples are continually taken at set intervals (defined by each product) and the average value is only reset when link is lost, the port is PoE disabled or when manually reset by the user as specified below.

This object is a read/write integer value with units of milliwatts. Writing a value of zero to this object resets its value to zero. Writing any other value to this object has no effect on its value and an error is returned.

Peak Power Usage

The a3ComPsePortPeakPower object specifies the peak power which has been consumed by the port. It is defined as the highest measured value of power in milliwatts that has been consumed by the port.

Its value is only reset when link is lost, the port is PoE disabled or when it is manually reset by the user as specified below.

It is a read/write integer value with units of milliwatts. Writing a value of zero to this object resets its value to zero. Writing any other value to this object has no effect on its value and an error is returned.

Fault Description

The a3ComPsePortFaultDescription object supports the fault category of the IETF Power MIB pethPsePortDetectionStatus object. A textual description containing more information about the nature of this fault is provided by this object. Typically this will detail the precise PoE hardware state which is causing the pethPsePortDetectionStatus object to be in the 'fault' state. It is a DisplayString of up to 255 characters.

Power Profile

The a3ComPsePortProfile object specifies which power profile is currently in use for this port, if any. It is an integer value, where a value of zero indicates that no power profile is currently in use. When a non-zero value is used it references the a3ComPseProfileIndex object in the power profiles table.

PSE Main Objects

Group Index

This object (pethMainPseGroupIndex) is imported from the IETF Power MIB and uniquely identifies the group containing the port to which power Ethernet PSE is connected. Group means (box in the stack, module in a rack) and the value 1 MUST be used for non-modular devices.

Power Limit

The a3ComMainPsePowerLimit object specifies the power limit set for the unit as a whole. The PoE unit will already have a nominal power defined by the IETF Power MIB pethMainPsePower object. This optional object specifies a further limit to this nominal power value. This may be useful to control the thermals of the unit, or for internal testing purposes. One possible use for this object may be to lower the power consumption of the unit if one or more of the internal fans have broken.

It is a read/write integer value with units of watts, chosen instead of milliwatts here since the IETF Power MIB measures unit based parameters, such as the pethMainPsePower object, in units of watts.

Peak Power Usage

The a3ComMainPsePeakPower object specifies the peak power which has been consumed for PoE. It is defined as the highest measured value of power in milliwatts that has been consumed at any one point in time by the sum of the PoE ports.

Its value is only reset when the unit is powered on or when it is manually reset by the user as specified below.

It is a read/write integer value with units of watts. Watts are chosen instead of milliwatts here since the IETF Power MIB measures unit based parameters, such as the pethMainPsePower object, in units of watts.

Writing a value of zero to this object resets its value to zero. Writing any other value to this object has no effect on its value and an error is returned.

Guaranteed Power Remaining

The a3ComMainPseGuaranteedPowerRemaining object specifies the amount of power remaining in the guaranteed power pool. Each time a port is placed into guaranteed mode it reserves a set amount of power out of the total guaranteed power pool for the system. This intention of this object is to give the client of this MIB (whether that be the CLI or the Web interface or the end user) an indication of how many ports can still be placed into guaranteed mode.

It is a read only integer value with units of watts.

Auto Detection Active

The a3ComPseAutoDetectionActive object specifies whether the device auto-detection feature is active. If this object is set to Active, and a known powered device is detected, then the port will automatically switch to Auto-Guaranteed mode. This is a stackwide object (i.e. it is not referenced by group index).

An enumerated integer value with the following values:

{   Not_Supported (1),
    Disabled (2),
    Enabled (3)   }

PSE Profiles

PSE power profiles exist to assist the user with configuring PoE devices. Ideally, a power profile should exist for each type of PoE device connected to the PSE. Some preset power profiles will exist on the PSE for devices such as NBX phones, so that these devices can easily be configured/guaranteed power by the user. Preset profiles always use guaranteed power mode.

Each power profile contains a name, a power mode, and an associated power rating (or more strictly, a power limit for the associated device). Once installed, profiles allow the user to guarantee PoE devices power without needing to know details of the devices power requirements. Profiles also allow management tools such as 3NS to identify the types of powered device connected to the PSE.

Profile Index

The a3ComPseProfileIndex object uniquely identifies the PSE profile within the stack There is no group index in this section; profiles are 'stackwide' entities).

Profile Name

The a3ComPseProfileName object assigns a name to the profile.

It is a read/write attribute with DisplayString type (fixed length character string).

Profile Power Mode

The a3ComPseProfilePowerMode object specifies the power mode associated with this profile. There are four power modes as listed below. When a power profile is applied to a port the value of this object dictates how the values of the ports priority (pethPsePortPowerPriority) and enabled (pethPsePortAdminEnable) objects will be configured.

This is an integer enumeration with the following values. It has read/write access:

{   powerDisabled (1),
    powerEnabled (2),
    powerGuaranteed (3),
    powerAutoGuaranteed (4)   }

The port priority (pethPsePortPowerPriority) object controls which ports are disconnected first when the power budget is reached on PSE equipment that is not capable of supplying full power (15.4 watts) to all PoE ports. There are three levels of priority, Low, High and Critical.

Profile Power Limit

The a3ComPseProfilePowerLimit object specifies the power limit to assign to the ports a3ComPsePortPowerLimit object when this profile is applied to a port. It is typically used with the powerGuaranteed or powerAutoGuaranteed power modes, but may also used in Power Enabled mode. It has a default value of 15400 (i.e. 15.4 watts). It is a read/write integer value with units of milliwatts.

Predefined Profiles

Some predefined profiles are expected to be present on the PSE. These may not be altered or redefined by the user. Preset profiles may exist for powered devices (PDs) such as NBX phones and wireless devices. These profiles allow the user to easily guarantee power to these devices without needing knowledge of the individual devices power requirements.

Also, by having preset profiles available with defined names, applications such as 3NS will be able to identify which ports are powering what devices on the network.

For example the switch may have the following preset profiles:

| Profile Index | Profile Name | Power Mode | Power Limit |
|---|---|---|---|
| 1 | NBX 1102 - 3C10121 | PowerGuaranteed | 6500 mW |
| 2 | NBX1102B - 3C10281B | PowerGuaranteed | 4100 mW |
| 3 | NBX 1102PE - 3C10281PE | PowerGuaranteed | 3000 mW |
| 4 | NBX 2101 - 3C10248B | PowerGuaranteed | 4100 mW |
| 5 | NBX 2101PE - 3C10248PE | PowerGuaranteed | 3000 mW |
| 6 | NBX 2102 - 3C10226A | PowerGuaranteed | 5250 mW |
| 7 | NBX 2102B - 3C10226B | PowerGuaranteed | 4100 mW |
| 8 | NBX 2102PE - 3C10226PE | PowerGuaranteed | 3000 mW |
| 9 | NBX 2102-IR - 3C10228IRA | PowerGuaranteed | 5250 mW |
| 10 | NBX 2102-IRB - 3C10228IRB | PowerGuaranteed | 4100 mW |
| 11 | NBX 2102PEIR - 3C10228IRPE | PowerGuaranteed | 3000 mW |
| 12 | AP8200 - 3CRWE820096A | PowerGuaranteed | 12700 mW |
| 13 | AP8500 - 3CRWE850096A | PowerGuaranteed | 12700 mW |
| 14 | AP8700 - 3CRWE870096A | PowerGuaranteed | 12700 mW |
| 15 | NJ95 - 3CNJ95 | PowerGuaranteed | 4500 mW |

-continued

| Profile Index | Profile Name | Power Mode | Power Limit |
|---|---|---|---|
| 16 | NJ100 - 3CNJ100 | PowerGuaranteed | 15400 mW |
| 17 | NJ200 - 3CNJ200 | PowerGuaranteed | 15400 mW |

SNMP Traps

The following SNMP traps may be supported by this 3FC. A limited number of traps are supported by the IETF Power MIB directly.

PoE POST Fault

This trap (a3comPsePOST_Trap) is raised whenever there is a PoE POST (Power On Self Test) fault. It is sent with the value of the stackConfigTable's stackUnitSerialNumber object, as this information could be useful in locating the faulty unit.

Power Management

The MIB defined herein supports the following power management scheme. There are four power modes which can be assigned to each PoE port.

Rather than develop a new MIB object to store this power mode, two existing MIB objects are used as described below.

Power Disabled Mode

PoE is disabled on the PoE port.

This mode relates to the following Power MIB configuration:
The IETF Power MIB pethPsePortAdminEnable object is set to disabled.

Power Enabled Mode

In this mode it is assumed that any port can draw up to the maximum of 15.4 watts. When the power budget of the switch is exceeded, power is not guaranteed to this port. If any port increases its power requirements or a guaranteed port is connected, causing the total power budget for the switch to be exceeded, one or more ports in Power Enabled mode may be disconnected until the switch is back within its power budget. Ports will be disconnected obeying priority order.

This mode also enables auto-detection feature, if installed, to detect PDs and place them into Power Auto-Guaranteed mode (see below).

This power mode may be the factory default mode for a PoE port.

This mode relates to the following Power MIB configuration:
The IETF Power MIB pethPsePortAdminEnable object is set to enabled.
The IETF Power MIB pethPsePortPowerPriority object is set to LOW priority.

Power Guaranteed Mode

This mode allows a defined amount of power to be guaranteed to a port. By virtue of using this mode, only a set number of ports can enter this mode. For example, if 10 ports have entered this mode at 15.4 watts and the PSE has a total power budget of 160 watts, if another port is requested access into this mode (at more than 4.6 watts), its access will be denied (additional PSE software will be required implement and ensure this behaviour).

The default behaviour should be to guarantee the port the full 15.4 watts. There should also be an option to limit the power on the port thus allowing more ports access to the guaranteed power mode.

If any port tries to draw more power than its guaranteed power limit the PSE will stop delivering power or restrict the power (corresponding to that limit) on that port. This is necessary to ensure that the other guaranteed ports are still guaranteed their power allocation. In this scenario, if the power to the port has been stopped, the PSE has a choice of whether to automatically redetect the PD (according to the IEEE 802.3af Standard) and subsequently re-power the port (up to its power limit), or permanently disable PoE on the port until is it re-enabled by user intervention. In either case the event should be reported back to the user.

This mode relates to the following Power MIB configuration:
The IETF Power MIB pethPsePortAdminEnable object is set to enabled.
The IETF Power MIB pethPsePortPowerPriority object is set to CRITICAL priority.

Power Auto-Guaranteed Mode

This mode is identical to the Power Guaranteed mode, except that the PD has been auto-detected as being a known device with known power settings as dictated by one of the predefined power profiles.

In this scenario, when a port is in the Power Enabled mode, with the auto detect object (a3ComMainPseAutoDetectionActive) set to enabled, and a known PD is detected, the port is automatically placed into Auto-Guaranteed mode. As with Guaranteed mode, this only occurs if there is enough power left in the guaranteed power budget.

If a port in Auto-Guaranteed mode gets any physical link up/down events then it is changed it back to enabled mode. Power auto-detection may then reoccur. This is to ensure that if the detected PD is disconnected and a different PD is connected, the new device does not automatically assume the PoE settings of the previously detected PD.

This mode relates to the following Power MIB configuration:
The IETF Power MIB pethPsePortAdminEnable object is set to enabled.
The IETF Power MIB pethPsePortPowerPriority object is set to HIGH priority.

The preset power profiles allow the user to easily guarantee power to critical powered devices such as NBX phones. Without the guaranteed power scheme, PSEs that cannot supply full PoE power on all ports (15.4 watts) would not be able to guarantee that a powered device such as an NBX phone is not disconnected from power when the power consumption of other ports in the system changes.

On PSEs that can supply full power to all ports the guaranteed power mode described in this document is redundant. Also the port power limit functionality has little purpose. The principal reason for limiting power on a PoE port is to manage the power budget more effectively.

The accuracy of the average and peak power measurements will depend on the functionality provided by the specific PoE hardware used and the design of the software to support this.

Mathematical Representation

An equation representing the guaranteed power scheme is as follows:

guaranteed_power_remaining =
$$\text{guaranteed\_power\_limit} - \text{guaranteed\_power\_used}$$
where:
guaranteed_power_used =
$$\sum_{p=1}^{N} \text{port\_power\_limit}(p) * \begin{Bmatrix} 1 \text{ if port critical priority} \\ 0 \text{ if port low priority} \end{Bmatrix}$$

N is the number of 'PoE' capable ports I the PSE.

A port is only allowed to be set to critical priority if:
guaranteed_power_remaining ≧ port_power_limit The guaranteed_power_limit would always be equal or less than the PSEs nominal power capability.

Program Code

Program code (in C code, with interspersed explanatons) for implementing the invention is as follows.

// GetGuaranteedPowerRemaining( )

This returns the amount of power that is left in the guaranteed power budget. The guaranteed power is calculated as the sum of the power limits set on each of the CRITICAL priority ports. It will never exceed the nominal power of the PSE (or the power limit as set using SetLimitPower( )).

WATTS cPower::GetGuaranteedPowerRemaining( )

```
{
    cPoweredPort * port;
    MILLIWATTS power = 0;
    UINT16 iter = 0;         // PoE port iterator
    Iterate through each of the PoE ports
    port = GetFirstPoweredPortObject(iter);
    while (port != NULL)
    {
        if (port->GetPriority( ) == cPoweredPort::CRITICAL)
        {
Sum up the power from each critical priority port
            power += port->GetPowerLimit( );
        }
        port = GetNextPoweredPortObject(iter);
    }
    Calculate the power remaining (in Watts)
    power = GetGuaranteedPowerLimit( ) - (power / 1000);
    'Sanity' check
    if (power < 0) assert(0);
    Return the guaranteed power remaining
    return power;
}
// SetPriority( )
```

This sets the priority of the port from a power management point of view. If the overall power budget of the device is exceeded this value controls which ports are disconnected from power first. There are three levels of priority. Ports set to CRITICAL are guaranteed power. If a request to set a port to CRITICAL is received which would bring the guaranteed power budget (see GetGuaranteedPower( )) over the nominal capacity of the PSE, then this call will fail and the priority will not be set. This ensures ports set to guaranteed power mode never lose power due to other ports requesting more power.

```
// enum ePriority { CRITICAL = 1, HIGH = 2, LOW = 3 };
RESULT cPoweredPort::SetPriority(ePriority priority)
{
    cPower *PowerObject = cPower::GetPowerObject( );
    MILLIWATTS PowerLeft;
    RESULT result = SUCCESS;
    if (mPDS.priority != priority)
    {
First make sure we protect the guaranteed power budget
        if (priority == CRITICAL)
        {
            PowerLeft =
            PowerObject->GetGuaranteedPowerRemaining( ) * 1000;
            if (PowerLeft < GetPowerLimit( ))
Check the power left with the power rating of the port
            {
Setting this port to CRITICAL priority will exceed the guaranteed
power budget
                return ~SUCCESS;
            }
        }
        if ((result = Proj__SetPriority(priority)) == SUCCESS)
        {
            mPDS.priority = priority;
Since we have changed a profiled attribute, clear any profile references
            mPDS.profile = NO__PROFILE;
            SaveToPDS( );
        }
    }
    return result;
}
// SetPowerLimit( )
```

This limits the amount of power that the port will supply (in milliWatts). It can be used for power management purposes. SUCCESS is returned unless the power_limit is out of range or there is a failure with setting this attribute in the PoE hardware.

```
RESULT cPoweredPort::SetPowerLimit(UINT16 power__limit)
{
    RESULT result = SUCCESS;
    cPower *PowerObject = cPower::GetPowerObject( );
    MILLIWATTS PowerLeft;
    if (mPDS.power__limit != power__limit)
    {
First make sure we protect the guaranteed power budget
        if (GetPriority( ) == CRITICAL)
        {
            PowerLeft =
            PowerObject->GetGuaranteedPowerRemaining( ) * 1000;
            if (PowerLeft < power__limit)
Check the power left with the requested power limit
            {
Changing this ports power limit will exceed the guaranteed power budget
                return ~SUCCESS;
            }
        }
        if ((result = Proj__SetPowerLimit(power__limit)) == SUCCESS)
        {
            mPDS.power__limit = power__limit;
Clear any over-current states, since we have a new power limit
            CurrentStatusClear( );
Since we have changed a profiled attribute, clear any profile references
            mPDS.profile = NO__PROFILE;
            SaveToPDS( );
        }
    }
    return result;
}
```

The invention claimed is:

1. A system for providing power over data lines, comprising a network switch including a multiplicity of ports each of which is capable of supplying power in addition to data packets;
a controllable power source which is coupled to said ports for supplying power thereto; and
a processor which is coupled to control the supply of power by said power source, and wherein said processor is programmed:
(i) to guarantee the supply of power to selected ports; and
(ii) to allow or inhibit the supply of power to ports other than said selected ports, having regard to a specified limit on the supply of power by the controllable power source and the total guaranteed power to the selected ports.

2. A system according to claim 1 wherein the processor provides for each port at least two modes, said modes being a first mode in which power to a specified value is guaranteed and a second mode in which the supply of power to the port is enabled but not guaranteed, and wherein the total supply of guaranteed power to ports in the first mode is limited to less than said limit and the power to ports in the second mode depends on the supply of power to ports in the first mode.

3. A system according to claim 2 wherein at least some of said ports are assigned an order of priority for the provision of guaranteed power and/or selective disconnection from the power source when in the second mode.

4. A system according to claim 1, wherein the guaranteed power for a port is automatically selected on the detection of a predetermined device connected to that port, having recourse to a stored power profile for that type of device.

5. A system according to claim 1 wherein the power supplied to said other ports is varied in accordance with the actual demand for power by the ports.

6. A method of providing power over data lines from a multiplicity of ports each of which is capable of supplying power in addition to data packets, the method comprising;
supplying power from a controllable power source which is coupled to said ports; and
controlling by means of a programmed processor the supply of power by said power source, the method further comprising:
(i) guaranteeing the supply of power to selected ports; and
(ii) allowing or inhibiting the supply of power to ports other than said selected ports, having regard to a specified limit on the supply of power by the controllable power source and the total guaranteed power to the selected ports.

7. A method according to claim 6 and providing for each port at least two modes, said modes being a first mode in which power to a specified value is guaranteed and a second mode in which the supply of power to the port is enabled but not guaranteed, and wherein the total supply of guaranteed power to ports in the first mode is limited to less than said limit and the power to ports in the second mode depends on the supply of power to ports in the first mode.

8. A method according to claim 7 wherein at least some of said ports are assigned an order of priority for the provision of guaranteed power and/or selective disconnection from the power source when in the second mode.

9. A method according to claim 6, wherein the guaranteed power for a port is automatically selected on the detection of a predetermined device connected to that port, having recourse to a stored power profile for that type of device.

10. A method according to claim 6 wherein the power supplied to said other ports is varied in accordance with the actual demand for power by the ports.

* * * * *